(12) United States Patent
Saito et al.

(10) Patent No.: US 7,822,888 B2
(45) Date of Patent: Oct. 26, 2010

(54) DATA BUFFER CONTROL WHICH CONTROLS SELECTION OF PATH AND OPERATION OF DATA BUFFER, BASED ON STORED CONFIGURATION INFORMATION

(75) Inventors: Miyoshi Saito, Kawasaki (JP); Hisanori Fujisawa, Kawasaki (JP); Ichiro Kasama, Kawasaki (JP); Tetsuo Kawano, Kawasaki (JP); Kazuaki Imafuku, Kawasaki (JP); Hiroshi Furukawa, Kawasaki (JP); Shiro Uriu, Yokohama (JP); Mitsuharu Wakayoshi, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 792 days.

(21) Appl. No.: 10/973,094

(22) Filed: Oct. 26, 2004

(65) Prior Publication Data
US 2006/0004940 A1 Jan. 5, 2006

(30) Foreign Application Priority Data
Jun. 30, 2004 (JP) ............................. 2004-194797

(51) Int. Cl.
  G06F 3/00 (2006.01)
  G06F 5/00 (2006.01)
  G06F 13/00 (2006.01)
  G06F 13/28 (2006.01)
(52) U.S. Cl. ......................................... 710/38; 711/138
(58) Field of Classification Search ................ 710/38
    See application file for complete search history.

(56) References Cited

U.S. PATENT DOCUMENTS

| 5,282,475 A | | 2/1994 | Urbach et al. |
| 5,617,549 A | * | 4/1997 | DeLano ...................... 712/206 |
| 5,699,530 A | | 12/1997 | Rust et al. |
| 5,828,475 A | * | 10/1998 | Bennett et al. ................ 398/52 |
| 5,896,516 A | * | 4/1999 | Powell et al. ............... 710/317 |

(Continued)

FOREIGN PATENT DOCUMENTS

EP 0 314 227 A 5/1989

(Continued)

OTHER PUBLICATIONS

Chen D C et al.; "A Reconfigurable Multiprocessor IC for Rapid Prototyping of Real-Time Data Paths"; IEEE International Solid State Circuits Conference; IEEE Service Center, New York, NY; US; vol. 35; Feb. 1, 1992; pp. 74-75, 249, XP000315770; ISSN: 0193-6530.

(Continued)

*Primary Examiner*—Chun-Kuan Lee
*Assistant Examiner*—Brooke J Dews
(74) *Attorney, Agent, or Firm*—Arent Fox LLP

(57) ABSTRACT

An operation apparatus includes a sequencer controlling states of a plurality of operation devices and a configuration memory storing therein configuration information as setting information for each state in the operation device. In the operation apparatus, a path which requires a data buffer and another path which requires no such a data buffer are provided for inputting data to the operation device, a data buffer control part is provided for controlling selection from these two paths and operation of the data buffer, and contents of path selection and operation control of the data buffer carried out by the data buffer control part are set according to the configuration information.

20 Claims, 27 Drawing Sheets

U.S. PATENT DOCUMENTS

| | | | |
|---|---|---|---|
| 6,275,975 B1 * | 8/2001 | Lambrecht et al. | 716/14 |
| 6,931,472 B1 * | 8/2005 | Kondo et al. | 710/310 |
| 7,263,602 B2 | 8/2007 | Schmit | |
| 2004/0103264 A1 | 5/2004 | Fujii et al. | |

FOREIGN PATENT DOCUMENTS

| | | |
|---|---|---|
| JP | 05-108586 | 4/1993 |
| JP | 05-265981 A | 10/1993 |
| JP | 07-319830 A | 12/1995 |
| JP | 2001-312481 | 11/2001 |
| JP | 2004-133781 | 4/2004 |
| WO | WO 2004/017223 A2 | 2/2004 |

OTHER PUBLICATIONS

European Office Action, dated Jan. 15, 2010, 5 pages.

\* cited by examiner

FIG.16

| CONFIGURATION INFORMATION | AUTOMATIC SENDING | INPUT SIZE | OUTPUT SIZE | EXTERNAL ACCESS | SOURCE ADDRESS |

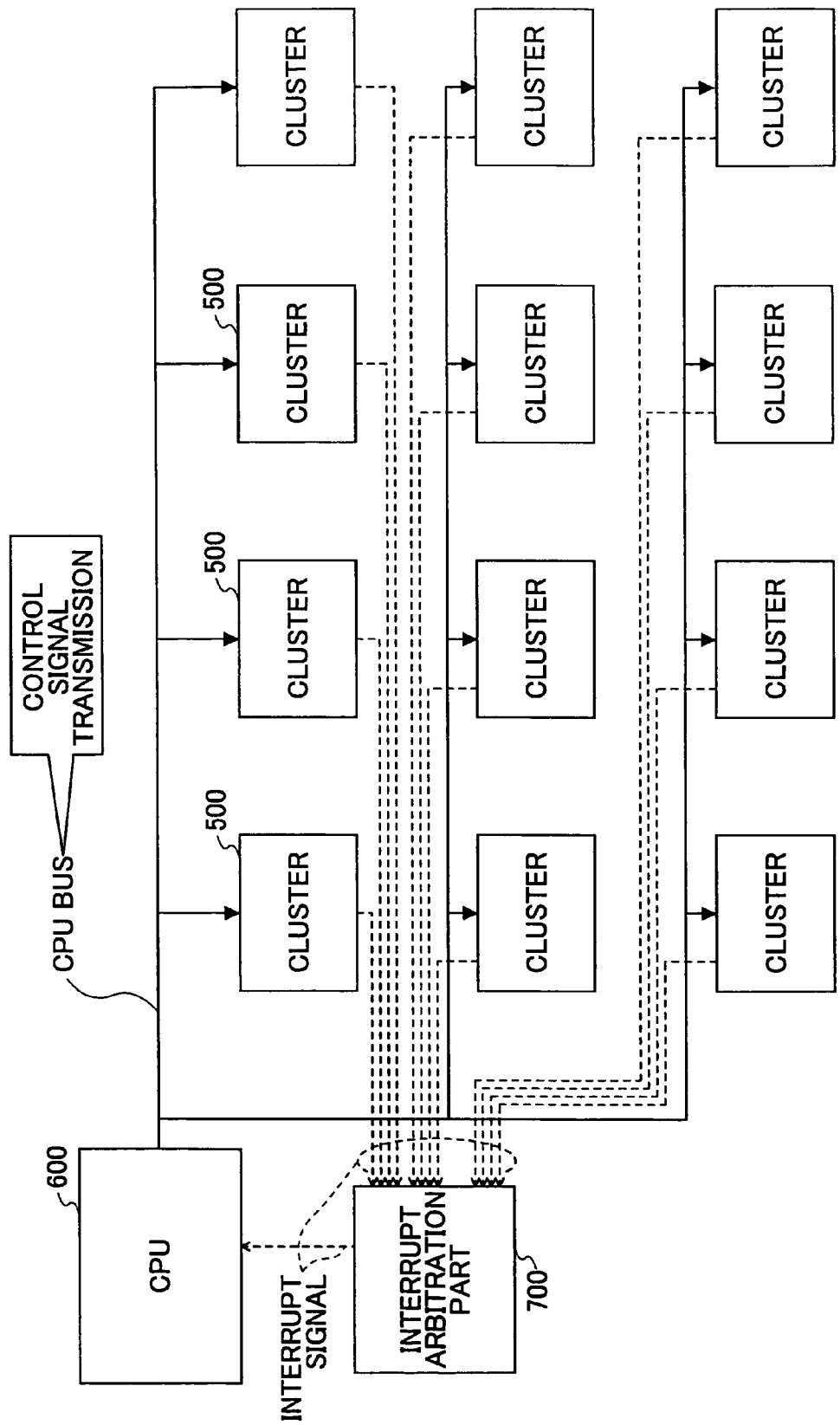

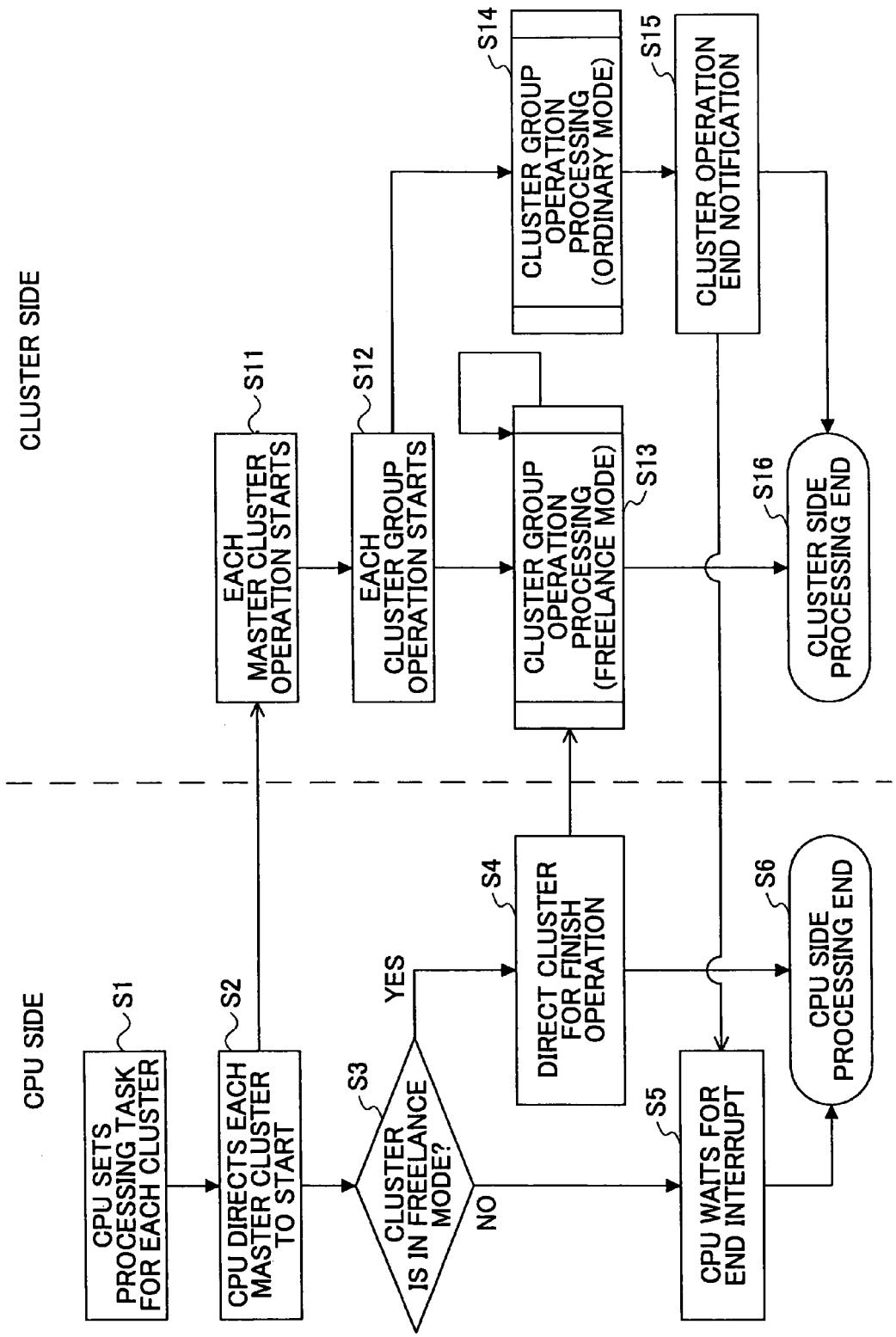

DATA BUFFER CONTROL WHICH CONTROLS SELECTION OF PATH AND OPERATION OF DATA BUFFER, BASED ON STORED CONFIGURATION INFORMATION

CROSS-REFERENCE TO RELATED APPLICATIONS

This application is based upon and claims priority of Japanese Patent Application No. 2004-194797, filed on Jun. 30, 2004, the contents being incorporated herein by reference.

BACKGROUND OF THE INVENTION

1. Field of the Invention

The present invention relates to an operation apparatus, an operation apparatus control method, a program and a computer readable information recording medium, and, in particular, to a reconfigurable operation apparatus by which various sorts of processing are made to carry out as a result of the configuration thereof being dynamically changed, a control method therefor, a program including instructions for carrying out the method and a computer readable information recording medium storing therein the program.

2. Description of the Related Art

For example, Japanese Laid-open Patent Application No. 2001-312481 discloses an operation apparatus having reconfigurable operation devices in which a processing algorithm is changeable as a result of connection among the plurality of operation devices being appropriately switched. This operation apparatus includes a state management part and a plurality of processor elements which are electrically connected in a form of a two-dimensional array. This configuration is referred to as a tile, and, Japanese Laid-open Patent Application No. 2004-133781 discloses a configuration in which a plurality of such tiles are provided. Data transfer among the tiles when the plurality of tiles are provided is carried out through transfer relay circuits being disposed among the tiles (see FIGS. 7, 8 and 9 of Japanese Laid-open Patent Application No. 2004-133781).

The transfer relay circuit is a double-directional tri-state buffer, and, the term 'buffer' therein means an amplifier in this case. Turning on/off thereof is controlled by a central control part which is provided separately from the tiles, or, in some case, is controlled by a state management part included in either one of the adjacent tiles. The plurality of the transfer relay circuits are provided between the pair of adjacent tiles. However, Japanese Laid-open Patent Application No. 2004-133781 does not particularly disclose how data lines of one of these tiles and data lines of the other tile are connected by the transfer relay circuits.

In other words, which data line in the other tile is connected with one data line of the one tile is not clearly disclosed. It is assumed that, one data line in the one tile is connected to a fixedly determined data line in the other tile through the transfer relay circuit. This is because, according to Japanese Laid-open Patent Application No. 2004-133781, such a configuration may be applied that direct connection is applied between some data lines, while some other data lines are connected via the transfer relay circuit.

Instead of such a transfer relay circuit, a common resource may be provided between adjacent tiles according to Japanese Laid-open Patent Application No. 2004-133781, FIG. 18. However, for this example, since further details are not disclosed while it is mentioned that a temporary holding circuit may be provided, a specific configuration thereof is not clear. Further, Japanese Laid-open Patent Application No. 2004-133781 also discloses an example in which both the transfer relay circuit and the common resource are provided (see FIG. 21 of the document).

Japanese Laid-open Patent Application No. 5-108586 discloses an operation apparatus having a plurality of processor elements. According to the document, an alternate buffer (in other words, a double buffer) is necessarily provided for communication between the processor elements, and therethrough, data transfer is carried out (see FIG. 6). A reason why such an alternate buffer is required is described next. Normally, in processing in a plurality of independent processors (having no common program counter thereamong), progress timing does not coincide thereamong even when beginning timing is made to coincide, in general, unless no dependent relationship exist thereamong at all, and also, the completely same processing is carried out. Such a relation of operation is referred to as an 'asynchronous operation', hereinafter. Therefore, timing at which one operation processor carries out data processing in a processor element does not coincide with progress timing of anther operation processor even in the same processor element, which processor communicates data with the other processor (asynchronous operation). Therefore, the asynchronous operation can be carried out properly provided that, during an interval in which one processor writes in one memory of the above-mentioned alternate buffer, the other processor reads out from the other memory of the same alternate buffer.

SUMMARY OF THE INVENTION

Flexibility in data transfer among many operation apparatuses may be degraded when many reconfigurable operation apparatuses are provided in which processing algorithm in each thereof may be changed as a result of connection among the plurality of operation devices being switched as mentioned above. That is, in a case where an algorithm is executed in a pipeline manner in cooperation among a plurality of reconfigurable operation apparatuses for example, data transfer thereamong should be synchronized in a level of clock cycle. For example, a case is assumed in which a reconfigurable operation apparatus A caries out pipeline processing of steps 1 through k, while a reconfigurable operation apparatus B carries out processing of steps k+1 through n (n>k). In this case, the processing should be continuously carried out without the above-mentioned alternate buffer or such inserted therebetween. This is because, when the alternate buffer is inserted, operation timing may be differed problematically. In other words, assuming that processing in a feedback manner is included in which the operation apparatus A further carries out processing in a step of n+1 in a last part of the processing, the algorithm may break down due to such a timing error.

Next, a case is discussed in which a plurality of reconfigurable operation apparatuses are made to execute different algorithms having mutual dependent relationship, respectively. For example, when reception processing in a PHY layer in IEEE802.11a is carried out, in a part thereof, 'carrier frequency error correction' and 'FFT' after that are carried out. In this case, the processing is continuously carried out therebetween. However, since data units to carry out are different therebetween, it is difficult to carry out the processing synchronously in a clock cycle level in a pipeline manner. In other words, although such a manner may be achieved despite that a design work requires a large manpower, since there is another method by which the relevant issue may be solved more easily, the other method is actually employed in many cases.

The above-mentioned other method by which the issue may be solved more easily is a method in which data after undergoing the 'carrier frequency error correction' processing is held in one memory of a double buffer in a desired order, while the other 'FFT' processing is carried out on the data which is read out from the other memory of the double buffer in an order which is convenient for carrying out the FFT. For example, Japanese Laid-open Patent Application No. 5-108586 discloses such a method.

However, when predetermined application processing is carried out with the use of a plurality of reconfigurable operation apparatuses, there is a case where a type of processing which should be carried out synchronously in a clock level and otherwise break down may occur when a double buffer is inserted as mentioned above, and another type of processing in which a double buffer is rather inserted as mentioned above so as to separate processing between different reconfigurable operation apparatuses are combined. For example, a case is assumed in which 'carrier frequency error correction' processing is carried out by a reconfigurable operation apparatus A while 'FFT' processing in steps 1 through k is carried out by a reconfigurable operation apparatus B, and 'FFT' processing in steps k+1 through n is carried out by a reconfigurable operation apparatus C. This case is a case in which the 'FFT' processing cannot be carried out by a single reconfigurable operation apparatus. In such a case, the type of processing in which a double buffer is inserted and data is transferred therewith and the other type of processing in which data transfer is carried out in synchronization in a clock level without insertion of a double buffer are combined.

In consideration of such a situation, it is preferable that arbitrary types of application processing can be executed with the use of a plurality of reconfigurable operation apparatuses, and, more specifically, it is preferable that any one of the reconfigurable operation apparatuses have a configuration such that it can carry out either one of the above-mentioned two type of data transfer processing.

In the case disclosed by Japanese Laid-open Patent Application No. 5-108586, a configuration which can carry out only one type of the data transfer employing a double buffer, and, in such a case, a processing algorithm may break down when processing requires data transfer between reconfigurable operation apparatuses with a serious requirement concerning operation timing as mentioned above.

Further, when a method of line connection between the tiles is limited to the method employing the data transfer relay circuit as in the case of the above-mentioned Japanese Laid-open Patent Application No. 2004-133781, it is not possible to apply a method employing the double buffer even when such a method is more effective. Furthermore, as to the case where both the common resource and the data transfer relay circuit are provided as disclosed by Japanese Laid-open Patent Application No. 2004-133781, although a description of providing 'a data temporary storage circuit for example' is included in the document, there is no particular description in further detail for a specific configuration of data storage, and also, since a function of the common resource is at most data communication between the tiles, it does not include a function of external data transfer.

Further, when the double buffer is used for data transfer in an arbitrary application, normally, a storage capacity required is different depending on each particular application to execute. Accordingly, it is necessary to provide a large storage capacity to positively prepare for any possible application. Therefore, assuming a case of providing the double buffer in the temporary storage circuit in the configuration disclosed by Japanese Laid-open Patent Application No. 2004-133781, since the double buffer should be provided for each data transfer relay circuit, in such a case, an area in a semiconductor chip required for providing the double buffers may increase accordingly so as to cause a problem. Although all of such data buffers provided in the respective ones of the data transfer relay circuits may not be always used, it is preferable to provide the data buffers for all the data transfer relay circuits considering flexibility and wide variety application of such a reconfigurable operation apparatus. However, when the data buffers are provided in all of the data transfer relay circuits, there may exit the data buffer which is not used at all among the data buffers which are thus provided for all the data transfer relay circuits thus provided between the respective ones of the adjacent reconfigurable operation apparatuses. As a result, a problem concerning excess redundancy may occur at this time.

According to the present invention, first, for the purpose of solving the first problem, i.e., in order to achieve a flexible configuration which enables carrying out both different types of processing manner including one type in which a data buffer is inserted between reconfigurable operation apparatuses for data transfer therebetween and the other type in which data transfer is carried out without insertion of such a data buffer, a configuration is provided such that any function can be selected from those two types of processing manner. i.e., selection may be made as to whether the data buffer is inserted or not for data transfer, where the data transfer may be one carried out with another reconfigurable operation apparatus or with the outside. Such a configuration may be provided in a reconfigurable operation apparatus 100 including a sequencer 110, an operation device group 180 and a configuration memory 120. In order to provide such a configuration flexibly applicable to any type of application to execute, necessary control is carried out as a result configuration information written in the configuration memory 120 being appropriately set, which information is, in other words, application processing information. In this configuration, the sequencer 110 carries out setting such as to select information (to designate a specific configuration) which is to be actually applied from among the configuration information stored in the configuration memory 120, as shown in FIG. 1.

In this configuration, it is possible to switch between the two types of data transfer including the one type without using a data buffer which may not be achievable in the configuration disclosed by Japanese Laid-open Patent Application No. 5-108586 and the other type of data transfer with the use thereof, for each configuration to actually apply.

Further, Japanese Laid-open Patent Application No. 2004-133781 does not disclose a specific configuration of the data buffer and merely discloses the common resource between the tiles. However, according to the present invention, it is possible to flexibly respond to many types of data input including one type of data input from another reconfigurable operation apparatus and the other type of data input from any other transmission source in the outside, as long as data input is made from the outside of the relevant reconfigurable operation apparatus.

In order to solve the second problem, i.e., in order to achieve a configuration in which a storage capacity in the data buffer can be effectively used, a data buffer module is provided in a same layer as that of a reconfigurable operation apparatus, for temporarily holding data and transfer data therefrom, for data transfer among a plurality of reconfigurable operation apparatuses or between the outside and the reconfigurable operation apparatus, each including a sequencer 110, an operation device group 180 and a configuration memory 120, for the purpose of carrying out data transfer effectively in response to characteristics of a particular application to execute. The data buffer module is connectable with an input or an output of the reconfigurable operation apparatus only when it is actually used, by means of a switch or such, and it is preferable that the data buffer module is sharable among the plurality of reconfigurable operation apparatuses.

In such a case, it may be assumed that total numbers of inputs and outputs of the reconfigurable operation apparatuses by which the double buffer is shared are larger than numbers of the inputs and outputs of the double terminal to be shared, respectively. In such a case, it is not possible that the double buffer is shared by all the relevant reconfigurable operation apparatuses simultaneously. However, actually, each reconfigurable operation apparatus may not always use the double buffer in its data transfer operation, and, thus, it may not be necessarily preferable to, in vain, increase the numbers of the inputs and outputs of the double buffer in consideration of optimizing the operation efficiency. Accordingly, there may be a case where it is preferable to rather decrease the numbers of inputs and outputs of the double buffer appropriately.

By providing the sharable double buffer as mentioned above, it is possible to effectively reduce the required number of data buffers, and as a result, it is possible to solve a problem from an increased required area in a semiconductor chip for providing many data buffers, since the required total number of the data buffers can be thus reduced.

FIG. 2 shows a manner of data transfer among a plurality of reconfigurable operation apparatuses according to the present invention. A unit of the reconfigurable apparatus configured by the sequencer 110, the operation device group 180 and the configuration memory 120 is simply referred as a 'cluster', hereinafter. In FIG. 2, a manner of data transfer in which, with the use of a data buffer module (simply referred to as a 'data buffer cluster', hereafter) 200 or such, a plurality of data are once held therein, and after that, they are read out therefrom, in sequence, as is necessary, is referred to as an 'anachronous data transfer' manner.

By employing such a configuration according to the present invention, the above-mentioned first and second problems can be solved, i.e., it is possible to enable selection between a mode of data transfer using a 'path passing through a buffer' and another mode using a 'path not passing through a buffer', flexibly for each particular situation according to the contents of an application to execute, and also, it becomes possible to achieve a configuration by which a capacity of a data buffer can be effectively utilized.

BRIEF DESCRIPTION OF THE DRAWINGS

Other objects and further features of the present invention will become more apparent from the following detailed description when read in conjunction with the accompanying drawings:

FIG. 16 illustrates a configuration of configuration information input to the data buffer part shown in FIG. 15;

FIG. 17 shows a control method by a CPU for a plurality of clusters according to one embodiment of the present invention;

FIG. 20 shows a flow chart of control operation carried out by a CPU for a plurality of clusters according to one embodiment of the present invention;

DETAILED DESCRIPTION OF THE PREFERRED EMBODIMENTS

Figure 3:
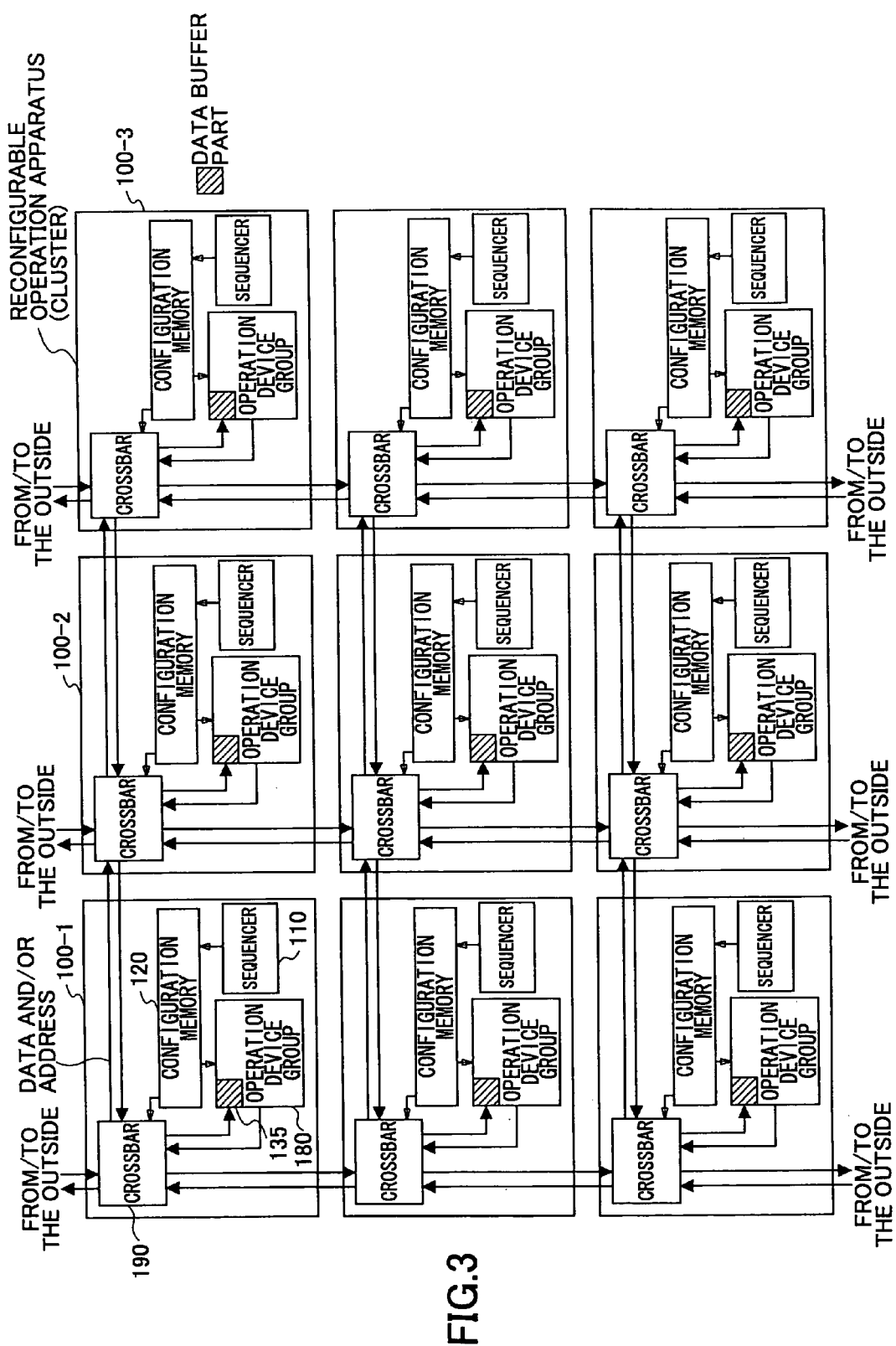
FIG. 3 shows a block diagram of an operation apparatus including a plurality of clusters according to a first embodiment of the present invention.

FIG. 3 shows an operation apparatus according to a first embodiment of the present invention. As shown, in the operation apparatus according to the present embodiment, a plurality of clusters 100-1, 100-2, 100-3, . . . (which may be generally referred to as simply 'cluster(s) 100', hereinafter) are electrically connected mutually through paths indicated by arrows, respectively. Each cluster 100 includes, as mentioned above, an operation device group 180 including many operation devices (see FIG. 4), a configuration memory 120 storing therein configuration information for enabling execution of various sorts of operation processing by setting respective states of these operation devices so as to flexibly change configurations thereof, and a sequencer 110 which provides an instruction to select information from among the configuration information stored in the configuration memory 120 to actually apply to the operation device group 180.

According to the present embodiment, a communication network among the clusters 100 is realized via crossbar switches 190 (simply referred to as 'crossbars', hereinafter) provided in the respective clusters. Further, with the use of the crossbars, data transfer is carried out between the clusters 100, between the cluster 100 and a data transfer buffer 135, between the cluster and the outside of the operation apparatuses (the set of the clusters 100), or between the data transfer buffer 135 and the outside.

In FIG. 3, the data buffer part 135 is provided in the operation device group 180, it is switchable between 'a mode using a data buffer' and 'a mode not using a data buffer' according to the configuration information set therefor.

Figure 4:
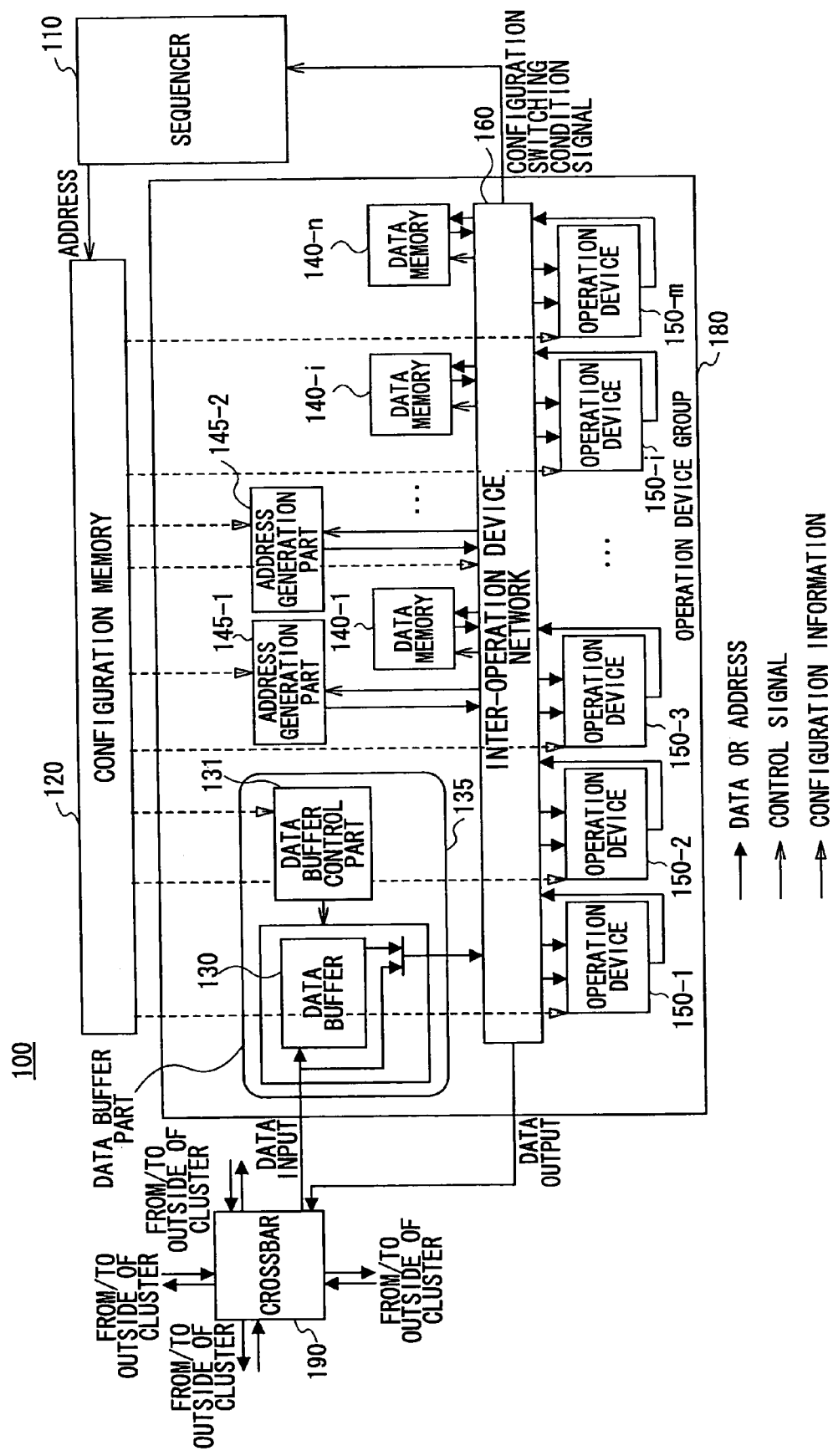
FIG. 4 shows a block diagram of an internal configuration of each cluster shown in FIG. 3.

FIG. 4 shows an internal configuration of each cluster 100. The cluster 100 has the crossbar 190 in this embodiment, and, the crossbar 190 functions as an interface depending on a network configuration in a case where the network configuration between the clusters 100 becomes different for each part. As inputs and outputs of the crossbar 190, in and out lines are shown one line each from each side of the crossbar 190 and also in and out lines from/to the inside of the cluster are shown one line each in the figure. However, this indication is for the purpose of simplification, and, actually, the in and out lines are provided four lines each. However, the number of the interface lines are not limited thereto. One line each or any arbitrary number of lines each may be provided instead.

The crossbar 190 switches not only data lines but also address lines to be output from the cluster and also address lines input externally. In this embodiment, electric wires are appropriately assigned for the data lines or the address lines when they are used. However, it is also possible to originally provide electric wires special for the data lines and electric wires special for the address lines, respectively.

Figures 5A, 5B:
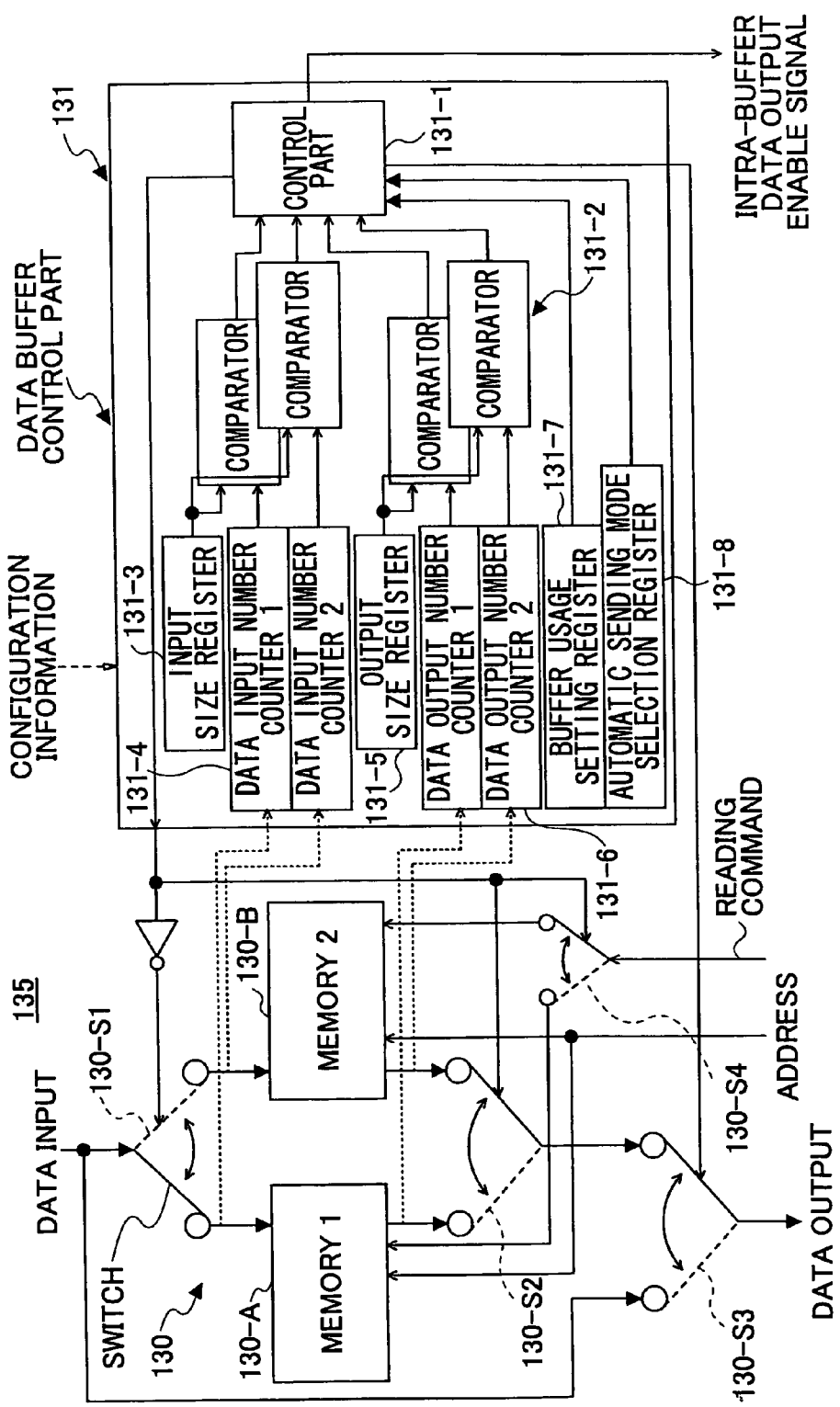
FIG. 5A shows a block diagram of a data buffer part according to the embodiment shown in FIG. 3.
FIG. 5B illustrates a configuration of configuration information input to the data buffer part shown in FIG. 5A.

FIG. 5A shows details of the data buffer part 135 shown in FIG. 4. FIG. 5A shows an internal configuration thereof, while FIG. 5B shows the configuration information input to the data buffer part 135. As shown in FIG. 5A, the data buffer part 135 includes a data buffer control part 131 and a double buffer 130. The data buffer part 131 includes respective comparators 131-2, a control part 131-1, an input size register 131-3, data input number counters 1, 2 (131-4) corresponding to double memories 130-A and 130-B of the double buffer 130, respectively, an output size register 131-5, data output number counters 1, 2 (131-6) corresponding to the double memories 130-A and 130-B of the double buffer 130, a buffer usage register 131-7 and an automatic sending mode selection registrar 131-8.

The respective comparators 131-2 include a comparator which compares a value held by the input size register 131-3 and a count value in the data input number counter 1 or the data input number counter 2, and another comparator which compares a value held by the output size register 131-5 and a count value in the data output number counter 1 or the data output number counter 2.

The data buffer 130 includes, in addition to the double memories 130-A and 130-B configuring the double buffer, change-over switches 131-S1, 131-S2, 131-S3 and 131-S4 carrying out switching control of data input/output for these memories.

When the configuration information having a configuration shown in FIG. 5B is supplied from the configuration memory 120, for each item thereof, a 'buffer usage' item is written in the buffer usage register 131-7, an 'automatic sending' item is written in the automatic sending mode selection register 131-8, an 'input size' item is written in the input size register 131-3, and an 'output size' item is written in the output size register 131-4. Based thereon, the control part 131-1 carries out determination processing as mentioned below. That is, according to these items of configuration information, various operation modes may be selected and set for executing respective particular applications.

When the 'buffer usage' item is effective, data is taken in the cluster 100 from the outside via the two memories 130-A and 130-B of the double buffer shown in FIG. 5A. When the 'buffer usage' item is ineffective, data is directly taken in the cluster 100 without passing through the double buffer.

Operation carried out in a case where the double memories 130-A and 130-B are used is described next. In this case, by means of setting of the 'automatic sending mode' item, it is determined whether or not the 'automatic sending mode' is effective. When the automatic sending mode is effective, the relevant comparator 131-2 compares input size information set in the 'input size' item in the configuration information with the number of input data in the memory on a side on which data is currently input externally (in this case, the memory 1 (130-A)). As a result, when the actual number of input data and the designated input size agree with one another, the control part 130-1 operates the change-over switches 130-1 through 130-4, appropriately, so as to switch the memory of the double buffer (the memory in an actual data input/output state, of the memories 130-A and 130-B), thus to read out the data thus written in the memory 1 (130-A) in the order same as the written order, and to output the same. At this time, for the other memory 2 (130-B) of the double buffer, writing therein is allowed from the outside of the cluster 100 (for this operation, description is made later with reference to FIGS. 23 through 25). At this time, the data is read out and output for the number of data according to the number written in the output size register 131-5. In other words, when the data is output from the memory 1, the data output number counter 1 (131-6) is incremented accordingly, the count value thereof is then compared by the comparator 131-2 with the value in the output size register 131-5. Then, when they agree with one another, the output from the memory 1 is stopped.

In this case, the number of input data should be equal to or larger than the previously designated output data size. However, although data written in the memory is read out from the top thereof in the above-mentioned example, it is not necessary to be limited to this manner. It is also possible to apply another arbitrary output mode by designating an address to read out alternately, skipping two addresses each, or such, by adding an appropriate mode for setting such an output mode.

In a case where the 'automatic sending mode' set in the configuration information is ineffective, the comparator 131-2 compares the 'input information' set in the configuration information with the number of input data actually input in the memory on the side receiving data externally (in this case, the memory 1, for example), and, when the number of the actually input data and the designated input size agree with one another, the control part 131-1 switches the memory, between those 130-A and 130-B (in other words, carries out switching between the memory to write thereto externally and the memory to read out the once written data therefrom so as to take it inside). Then, in this case, the control part 131-1 outputs a predetermined 'intra-buffer data output enable signal' to the inside of the cluster 100. The inside of the cluster 100 receives this signal in a counter provided for memory access (i.e., an address generation part 145), and generates a reading command for the data buffer part 135. At this time, a memory address included in the reading command is generated by the address generation part 145 or the operation device 150 in the relevant cluster. Alternatively, an entry in a data memory 140 in the cluster 100 may be used, and is supplied to the data buffer part 135, for this purpose.

According to this mode, it is made possible to take data in the cluster from the data buffer part 135 in an arbitrary address order according to an operation processing algorithm set in the configuration information. After the data is thus output from the data buffer for the designated number set in the output size register 131-5, the output of the 'intra-buffer data output enable signal' is stopped. Thereby, the memory access to the data buffer from the inside of the cluster is stopped. It is not necessary to be limited to this manner, and instead, the following manner may be employed: That is, the number of data to take in is recognized by the inside of the cluster (in other words, the inside of the cluster has the information same as the above-mentioned designated output size information), counting of the reading commands which have been output is carried out by a device which generates the reading command, and then, the device stops the output of the reading command according to the count value. By employing such a manner, stop of taking data from the data buffer 135 is freely controllable by the end which receives the data. In this case, it become not necessary to detect a stop of the 'intra-buffer data output enable signal' to stop the taking data operation as mentioned above.

Further, in a case where the input information taken in the cluster 100 externally is an 'address', normally the double buffer 130 may not be used, and it is directly input to the inside of the cluster 100. Thus, it is necessary to carry out a change as to whether or not the data buffer part 135 is inserted depending on a particular type of the input information. Such selection can be freely designated with the use of the configuration information in the configuration memory which can be set arbitrary.

Figure 6:
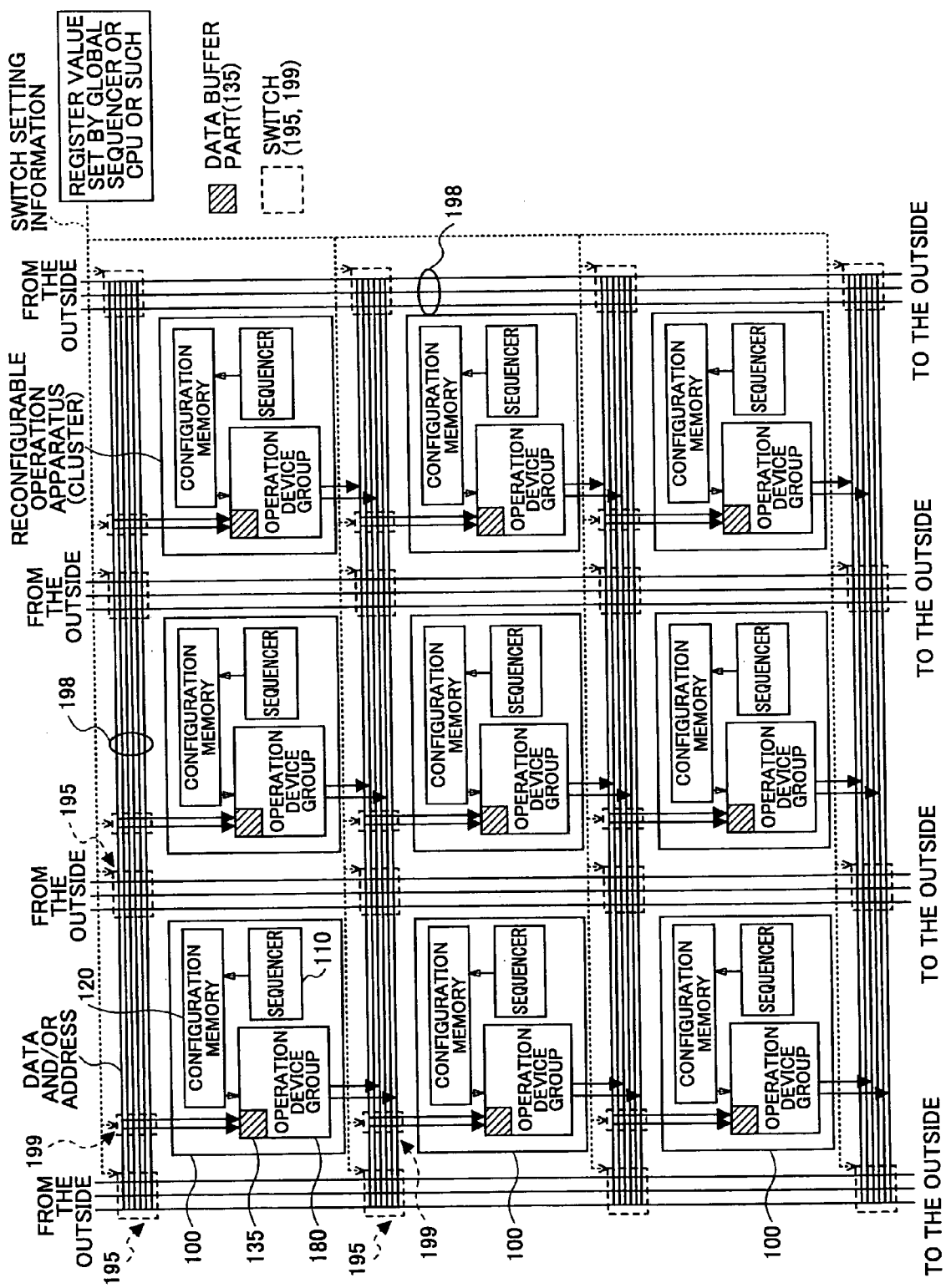
FIG. 6 shows a block diagram of an operation apparatus including a plurality of clusters according to a second embodiment of the present invention.

In the first embodiment described above, operation setting for the crossbar 190 in each cluster 100 is made not only according to the configuration information in the configuration memory of the same cluster 100 but also, according to a register value set by a global sequencer, a CPU or such shown in FIG. 6 as in a second embodiment described later.

The second embodiment of the present invention is described next. FIG. 6 shows a configuration of an operation apparatus including many (nine, in this example) clusters 100. What is different from the above-described first embodiment is that the communication network for electric connection among the plurality of clusters included in the operation apparatus is configured by electric wires 198, switches 195 provided at points at which the electric wires intersect together and cluster input switches 199. In this case, it is possible to provide switches at cluster output parts instead of the cluster input switches 199.

Figure 7:
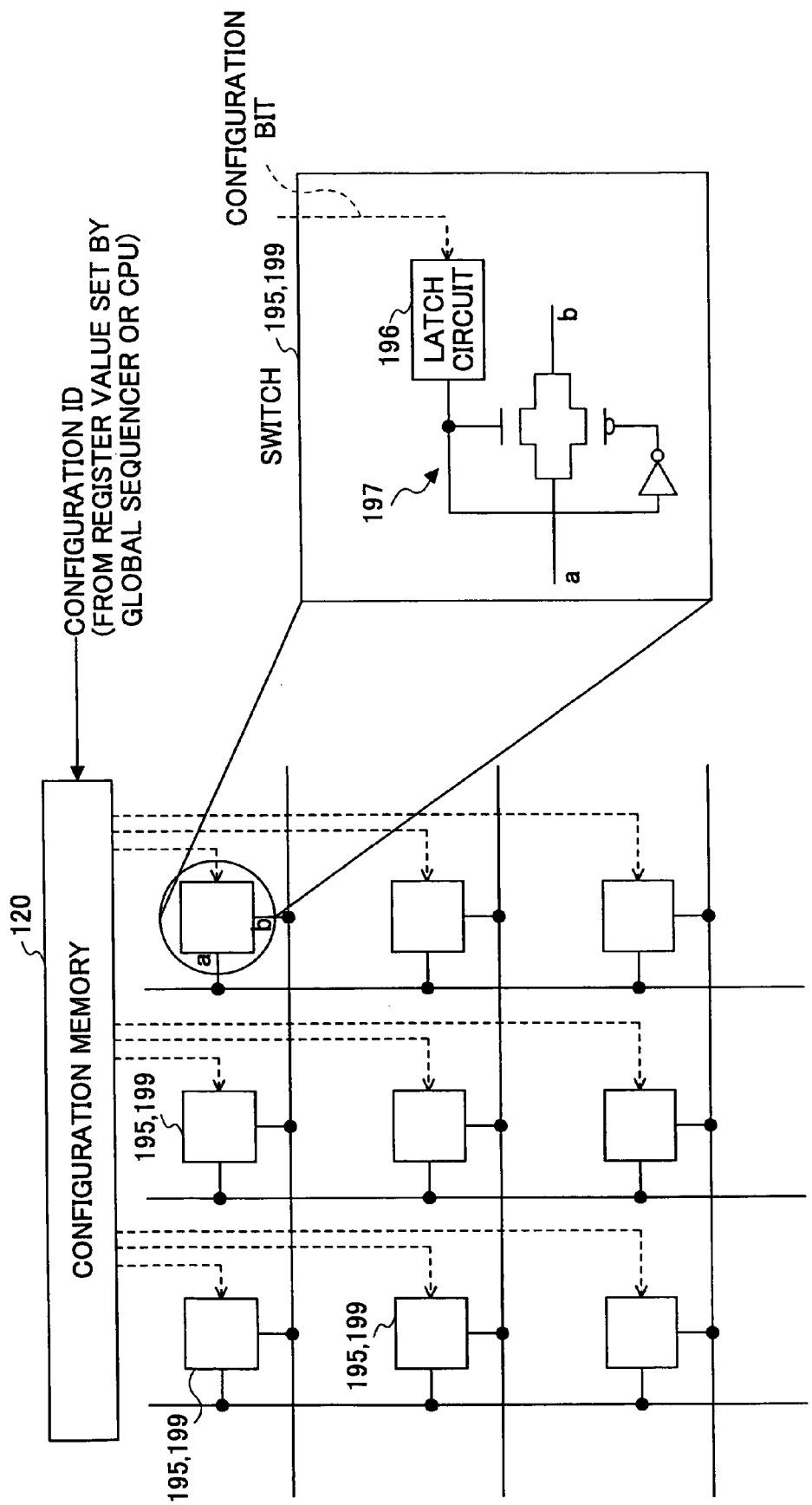
FIG. 7 illustrates a configuration of a switch according to the embodiment shown in FIG. 6.

FIG. 7 shows an example of a configuration of each switch element included in the above-mentioned switch parts 195 and 199. As shown, each switch element 195 or 199 includes a semiconductor switch circuit 197 actually turning on/off an electric circuit, and a latch circuit 196 controlling it. For the latch circuit 196, a configuration bit as the configuration information is provided from the configuration memory 120, and is held there. By means of the configuration bit held there, turning on/off of each switch element is controlled, and as a result, it is possible to make setting of the electric wires 198, intersections 195 or the cluster input parts 199 such that it is set whether or not interconnection between arbitrary electric wires or data taking from arbitrary electric wires is effected.

Actual setting in the switches 195 and 199 is carried out by register values set by the global sequencer or the CPU outside of the clusters. As mentioned above, setting for the switch part is held by the latch circuit 196. Data writing to the latch circuit 196 is carried out in such a manner that, a plurality of bits of the configuration information are previously held in a memory adjacent to the switch circuit 195 or 199, and the above-mentioned global sequencer or the CPU outputs a predetermined switching timing and an identification number of the configuration information for the switching. With these signals, a relevant bit of the configuration information is selected from the configuration information previously held by the adjacent memory, is read out therefrom, is provided to the latch circuit 196, and thereby, a desired connection switching is effected.

Figure 8:
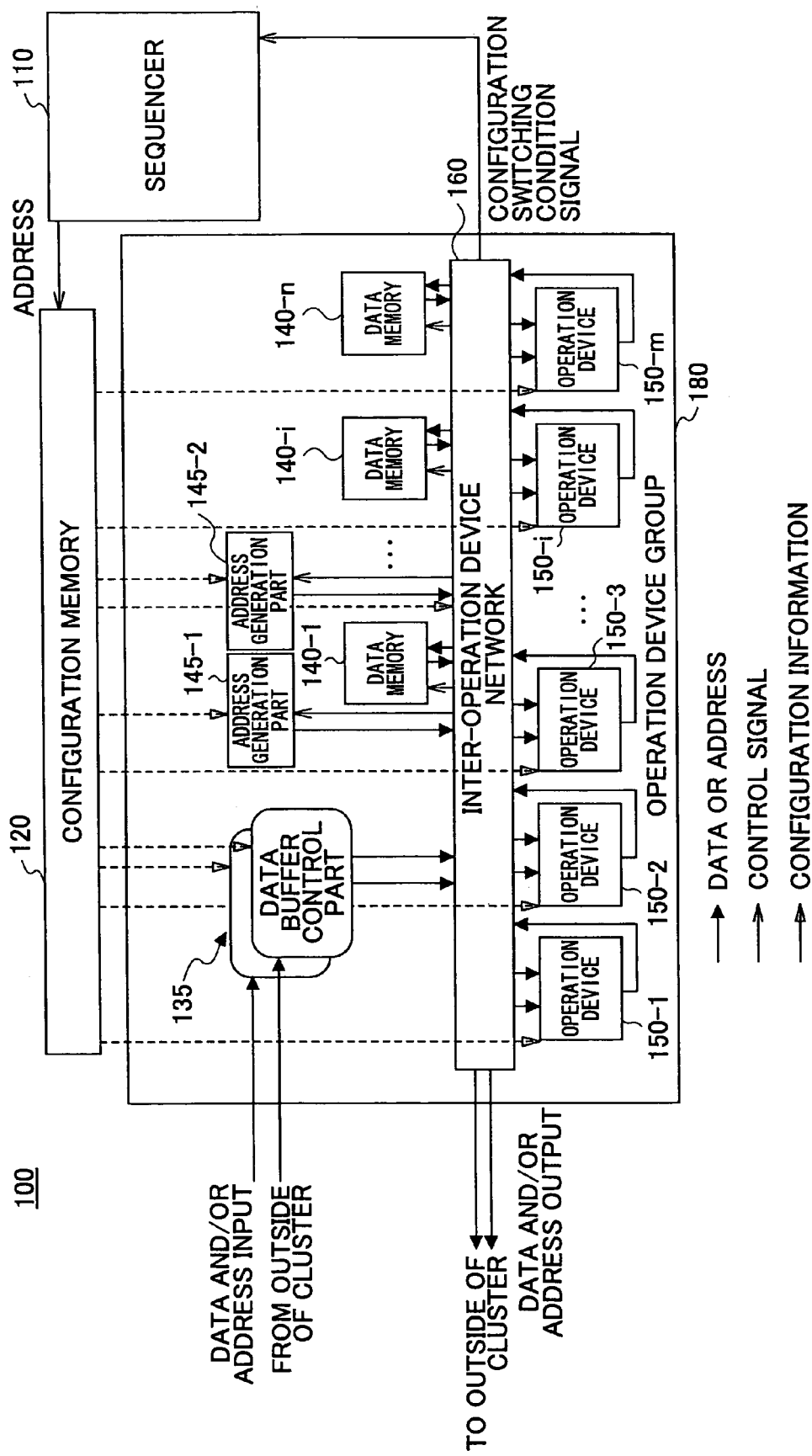
FIG. 8 shows a block diagram of an internal configuration of each cluster according to the embodiment shown in FIG. 6.

In this second embodiment, the crossbar 190 becomes unnecessary for each cluster 100. FIG. 8 shows an internal configuration of each cluster 100 included in the operation apparatus according to the second embodiment of the present invention. In this case, two data buffer parts 135 are provided for two lines of input, i.e., data input and address input. A configuration of each data buffer part 135 is same as that in the first embodiment, and the depilated description is omitted.

Figure 9:
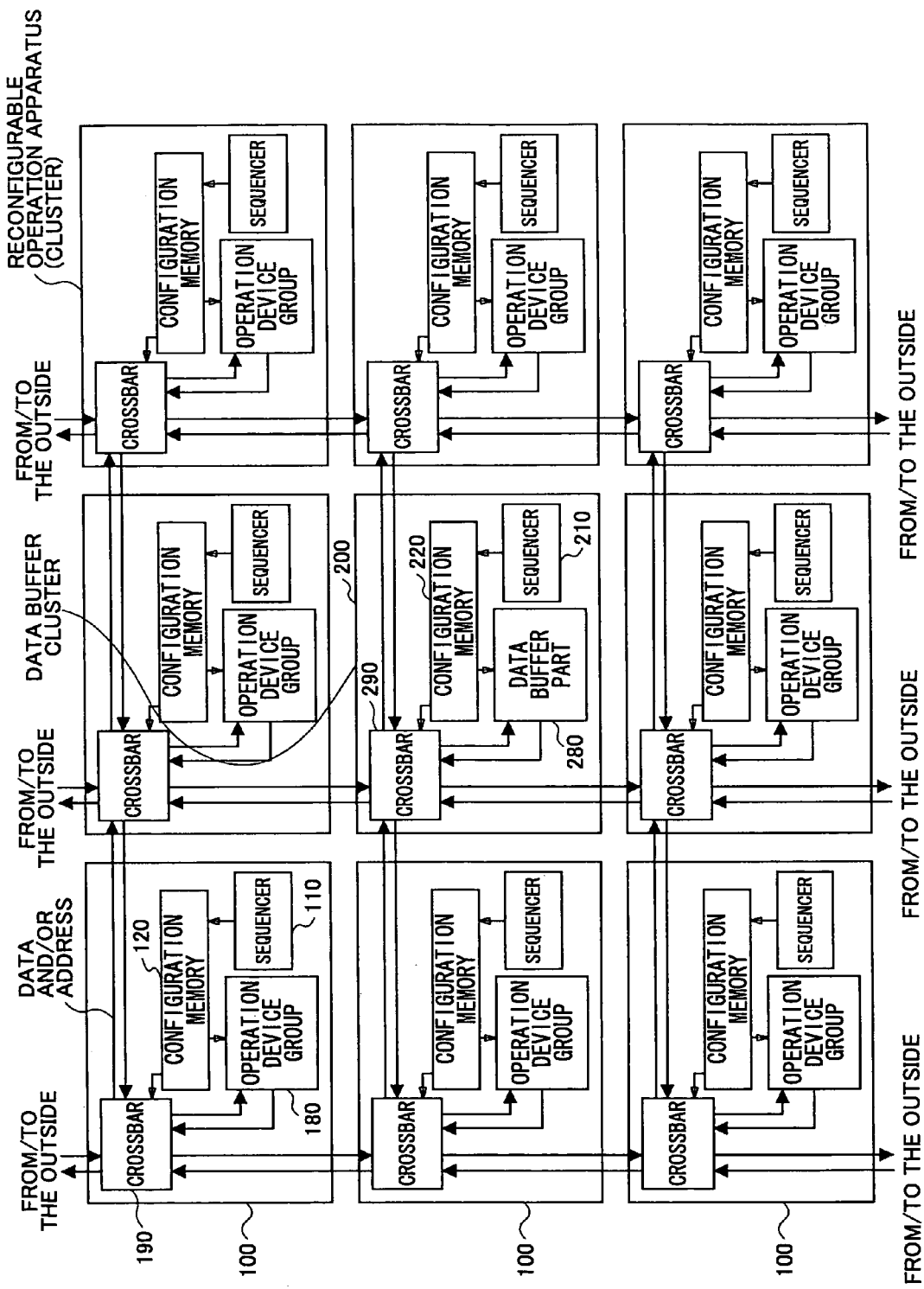
FIG. 9 shows a block diagram of an operation apparatus including a plurality of clusters according to a third embodiment of the present invention.

FIG. 9 shows a configuration of a reconfigurable operation apparatus including a plurality of clusters according to a third embodiment of the present invention. What is different from the above-described first and second embodiments is that, the data buffer part 135 included in each cluster 100 is made independent to be in a form of the data buffer cluster 200, and thus, is provided on the same level as the other clusters including the operation device groups. By applying a cluster form also for the function of the data buffer as that of the other clusters, control of the data buffer can be carried out in a same category as that of control of the other clusters, and thus, it is possible to simplify the control algorithm.

In each of the above-described first and second embodiments, the data buffer part 135 is provided in each of all the clusters 100. In that case, when a configuration is provided by which an arbitrary application can be executed therein, it is necessary to provide a large storage capacity for each of these buffers since the storage capacity should be prepared sufficiently to efficiently execute any of possible application. Further, in a case where a plurality of input lines are provided, it is necessary to provide a data buffer part for each thereof in order to properly prepare sufficiently for each thereof. However, it is noted for this case, even in the first or second embodiment, it is possible to provide a data buffer part only for some or one these input lines. In other words, it is possible to provide a configuration such that only the number of data buffer parts smaller than the actual number of the input lines are provided, and the capacities thereof are appropriately allocated for actually necessary input lines when it is necessary. In the case where the data buffer part 135 is provided for each of all the clusters 100, the total of the capacities of the respective data buffer parts 135 tends to become much larger. In order to solve this problem, according to the third embodiment, the data buffer part 135 is not provided for each cluster, but the same function is achieved by a form of an independent cluster-type data buffer, called 'data buffer cluster' as mentioned above, which is independent from each cluster including the operation device group. Thereby, it becomes possible to effectively utilize the buffer capacity of the data buffer. A manner of mapping in an algorithm for such a case is, for example, such as that shown in FIG. 2 described above. That is, in a case where inter-cluster synchronous data transfer is carried out, data transfer is carried out directly between relevant clusters, while data transfer via the data buffer cluster 200 is carried out for carrying out asynchronous data transfer.

The data buffer cluster 200 includes data buffer part(s) 280 which includes data buffers (281, see FIG. 10) and a data buffer control part (282) controlling operation of the data buffer, a configuration memory 220 storing therein setting information (configuration information) concerning operation control of the data buffer, and a sequencer 210 carrying out switching control of a state in the data buffer control part by designating an appropriate part of the configuration information stored in the configuration memory.

Figure 10:
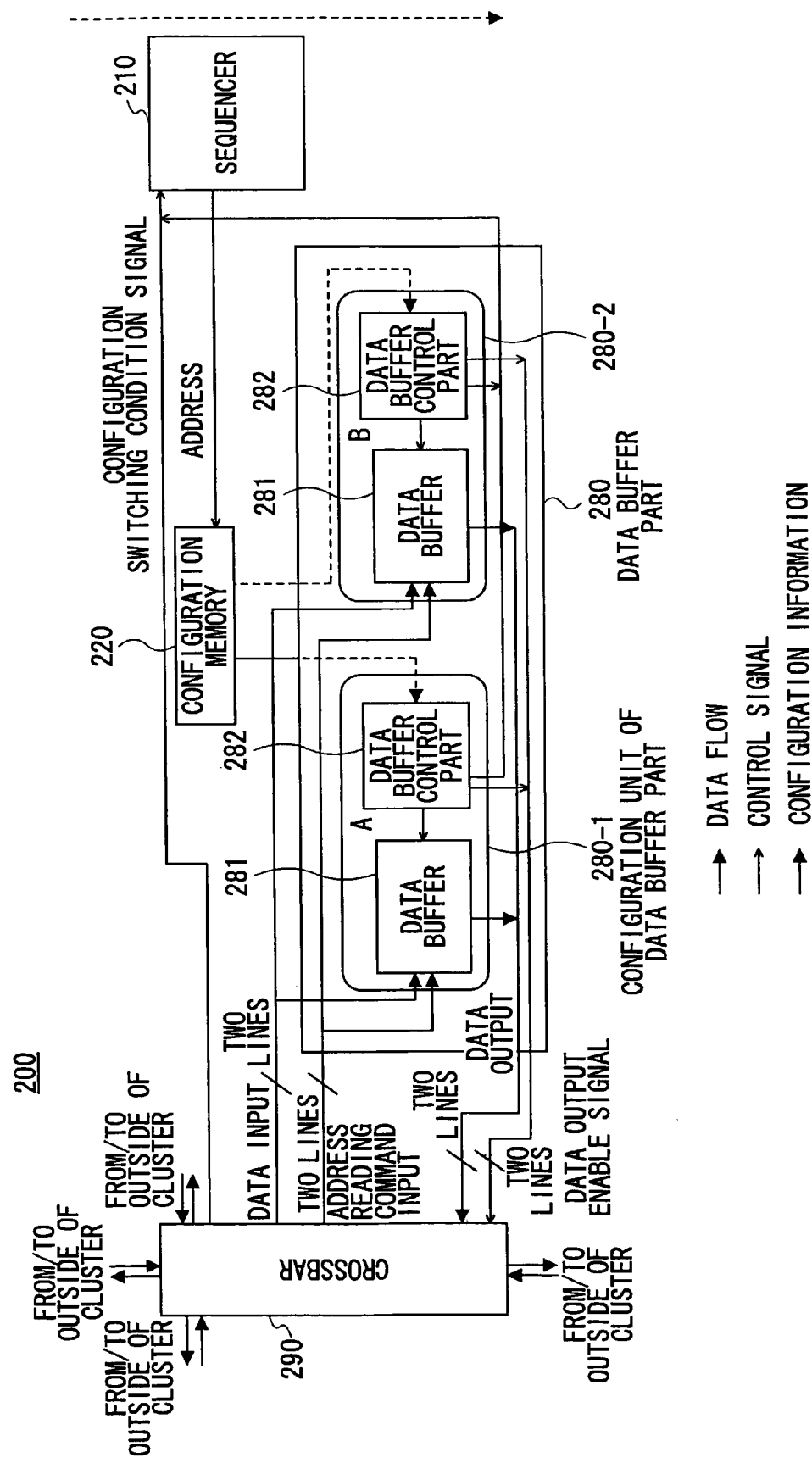
FIG. 10 shows a block diagram of an internal configuration of a data buffer cluster in the embodiment shown in FIG. 9.

FIG. 10 shows a configuration of the above-mentioned data buffer parts 280 (280-1 and 280-2). The cluster 200 (simply referred to as 'data buffer cluster') special for providing the data buffer part function includes, as mentioned above, the same as the cluster 100 accommodating the operation device group, the configuration memory 220 storing therein the configuration information for setting the state of the data buffer parts 280, the sequencer 210 designating a configuration information part actually applied to the data buffer part 280 from the configuration information stored in the configuration memory 220, and a crossbar 290 controlling information transfer between the inside of the data buffer cluster 200 and the outside thereof.

Since the data buffer cluster 200 is provided on the same level as that of the other clusters 100 accommodating the operation device groups, as mentioned above, it includes the crossbar 290, the sequencer 210 and the configuration memory 220, and in this case, entries of the configuration memory 220 include information for setting the data buffer control part 282 (in the data buffer part 280) and setting information for the crossbar 290.

In this example, two data input lines, i.e., the two lines for an address and a reading command, and two data output lines are provided. Since the reading command for the data buffer requires two bits at most, the most significant bit and the immediately subsequent bit are used in this case for this purpose, and the command is sent together with the address. Further, for a predetermined configuration switching condition signal sent from another cluster in this case, two significant bits are added in the data input lines, and are used for handling this signal.

Furthermore, in the data output lines, a signal line for the 'intra-buffer data output enable signal' is added. That is, the crossbar 290 shown in FIGS. 9 and 10 carries out data transmission of not only address and data, but also the above-mentioned configuration switching condition signal, an access command for the data buffer, and the intra-buffer data output enable signal. The configuration switching condition signal for a data input purpose and the intra-buffer data output enable signal for a data output purpose share a same bit outside of the cluster. This manner is allowed since a part which receives the signals has a function of distinguishing therebetween. Such a bit sharing manner is applied for the purpose of saving a required area on the semiconductor chip. However, it is also possible to use two separate bits for this purpose.

The above-mentioned intra-buffer data output enable signal has the same function as the intra-buffer data output enable signal described above with reference to FIG. 5A, and is a signal for providing an instruction for beginning and ending of memory access for the cluster 100 which requires data taking from the data buffer. Further, the configuration switching condition signal is a signal which is generated when a predetermined condition is satisfied in a process of operation processing in another cluster 100 concerning execution of a particular application, and the signal provides a predetermined switching condition concerning state setting or operation setting for the relevant data buffer cluster 200.

In this example, the crossbar 290 for data transmission is used as it is for the purpose of transmission of the three types of signals, i.e., the configuration switching condition signal, the intra-buffer data output enable signal and the address+reading command signal. However, it is also possible to employ other separate lines of data communication network for this purpose.

Figures 11A, 11B:
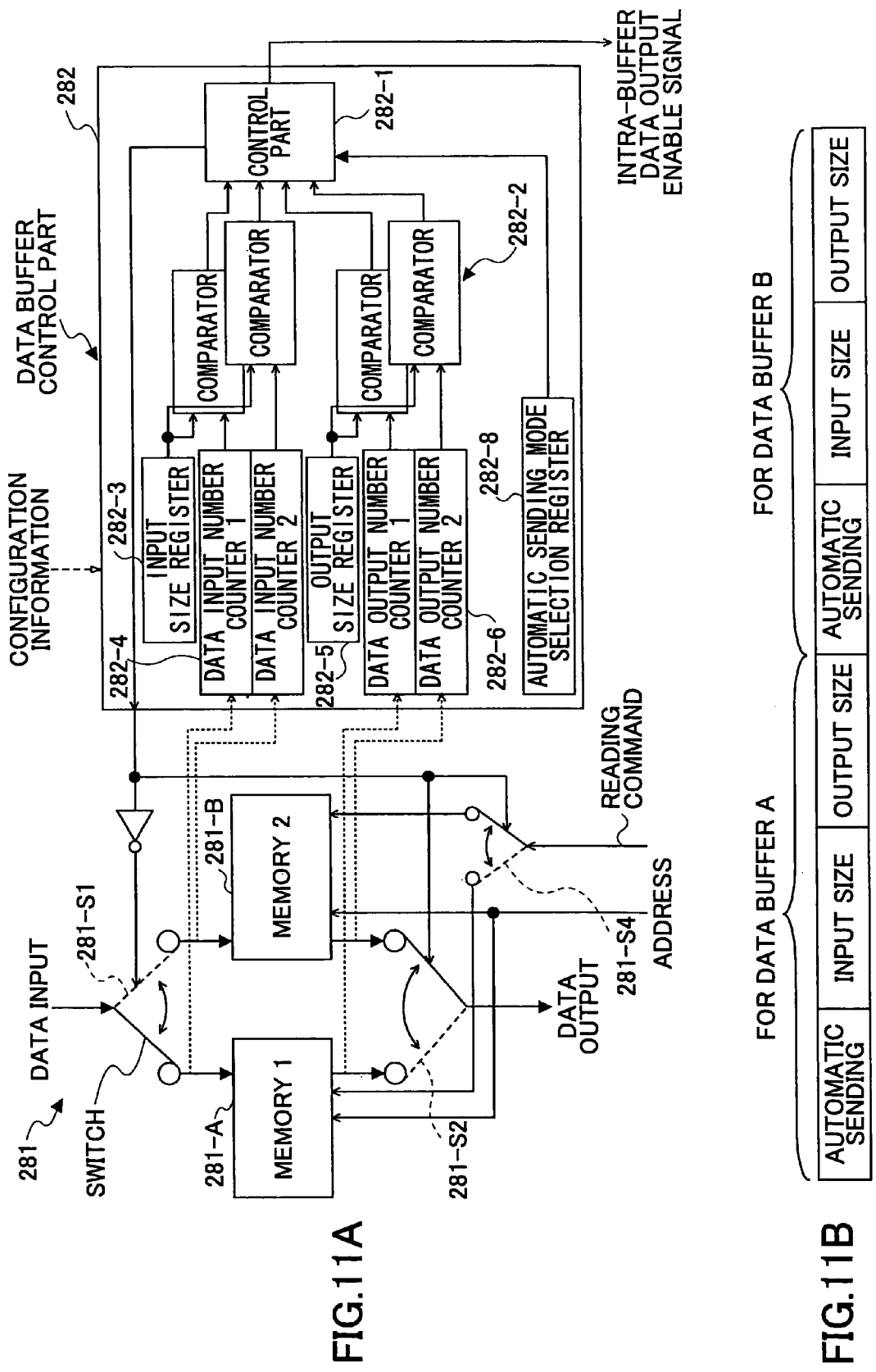
FIG. 11A shows a block diagram of a data buffer part according to the embodiment shown in FIG. 9.
FIG. 11B illustrates a configuration of configuration information input to the data buffer part shown in FIG. 11A.

FIG. 11A shows a detailed configuration of each data buffer part 280 in the third embodiment of the present invention. In this example, different from that shown in FIG. 5A, no mode concerning usage of the buffer is included. This is because, any case where the data buffer cluster 200 is used always corresponds the 'buffer usage' mode in the first embodiment shown in FIG. 5A. Therefrom, in the configuration shown in FIG. 11A, the switches 130-S3 for bypassing is not included. The other part of the configuration and basic operation thereof are same as those in the first embodiment described above with reference to FIG. 5A.

Respective parts shown in FIG. 11A, i.e., a control part 282-1, an input size register 282-3, data input number counters 1, 2 (282-4) for the respective memories 281-A and 281-B., an output size register 282-5, data output number counters 1, 2 (282-6) for the respective memories 281-A and 281-B and an automatic sending mode selection register 282-8 correspond to the control part 131-1, the input size register 131-3, the data input number counters 1, 2 (131-4) for the respective memories 130-A and 130-B, the output size register 131-5, the data output number counters 1, 2 (131-6) for the respective memories 130-A and 130-B and the automatic sending mode selection register 131-8 shown in FIG. 5A, respectively, and have the same functions. Accordingly, duplicated description therefor is omitted. Change-over switches 281-S1, 281-S2 and 281-S4 correspond to the change-over switches 130-S1, 130-S2 and 130-S4 shown in FIG. 5A, respectively.

In this example, in a case where the automatic sending mode is ineffective, start of data buffer reading from another cluster 100 is carried out in the following manner: That is, the other cluster 100 which receives a rising edge of the 'intra-buffer data output enable signal' generates the 'address+reading command' signal for the data buffer cluster 200. This part of operation is the same as that in the above-mentioned embodiment in which the data buffer is provided inside of the cluster 100. However, according to the present embodiment, the reading command is generated by an address generation part in this other cluster 100, and is sent out therefrom. Then, this other cluster 100 compares a counter value for memory access with a value in a register in which a desired data number set according to the configuration information is written (a register corresponding to the output size register 283-5), and, when they agree with one another, this other cluster 100 stops generation of the reading command for the data buffer cluster 200. The other part of operation is same as that in the case of FIG. 5A, and the duplicated description is omitted.

In the third embodiment, the configuration information shown in FIG. 11B includes, as shown, two sets of configuration information corresponding to the respective two data buffer parts (280-1 and 280-2) shown in FIG. 11A. That is, for each of the two data buffer parts, an 'automatic sending mode' setting field, an 'input data size' information field and an 'output data size' information field are provided. As mentioned above, since a 'buffer usage' setting field is not necessary, it is omitted in this case.

Figure 1:
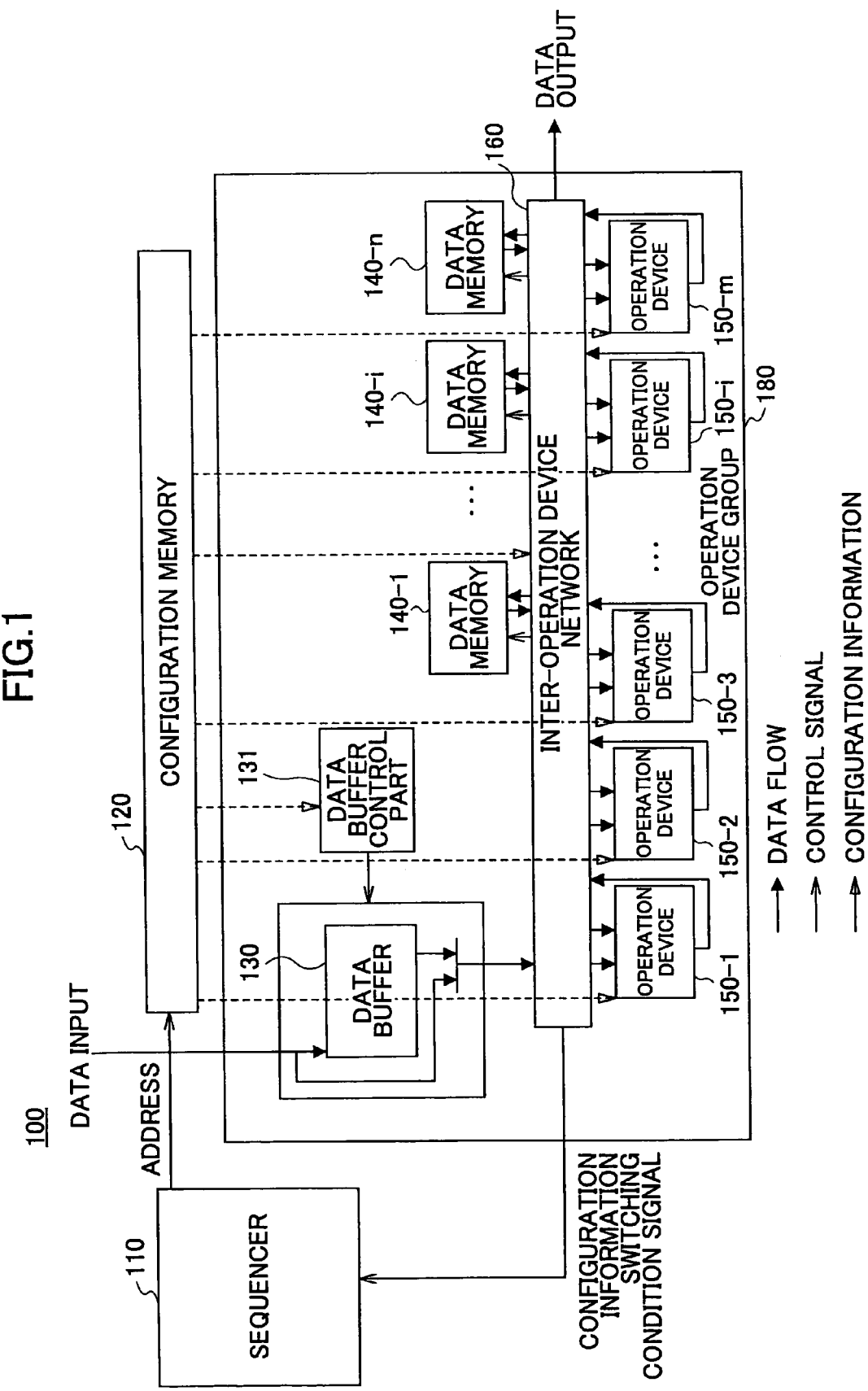
FIG. 1 shows a block diagram of a reconfigurable operation apparatus (cluster) in one embodiment of the present invention.
Figure 2:
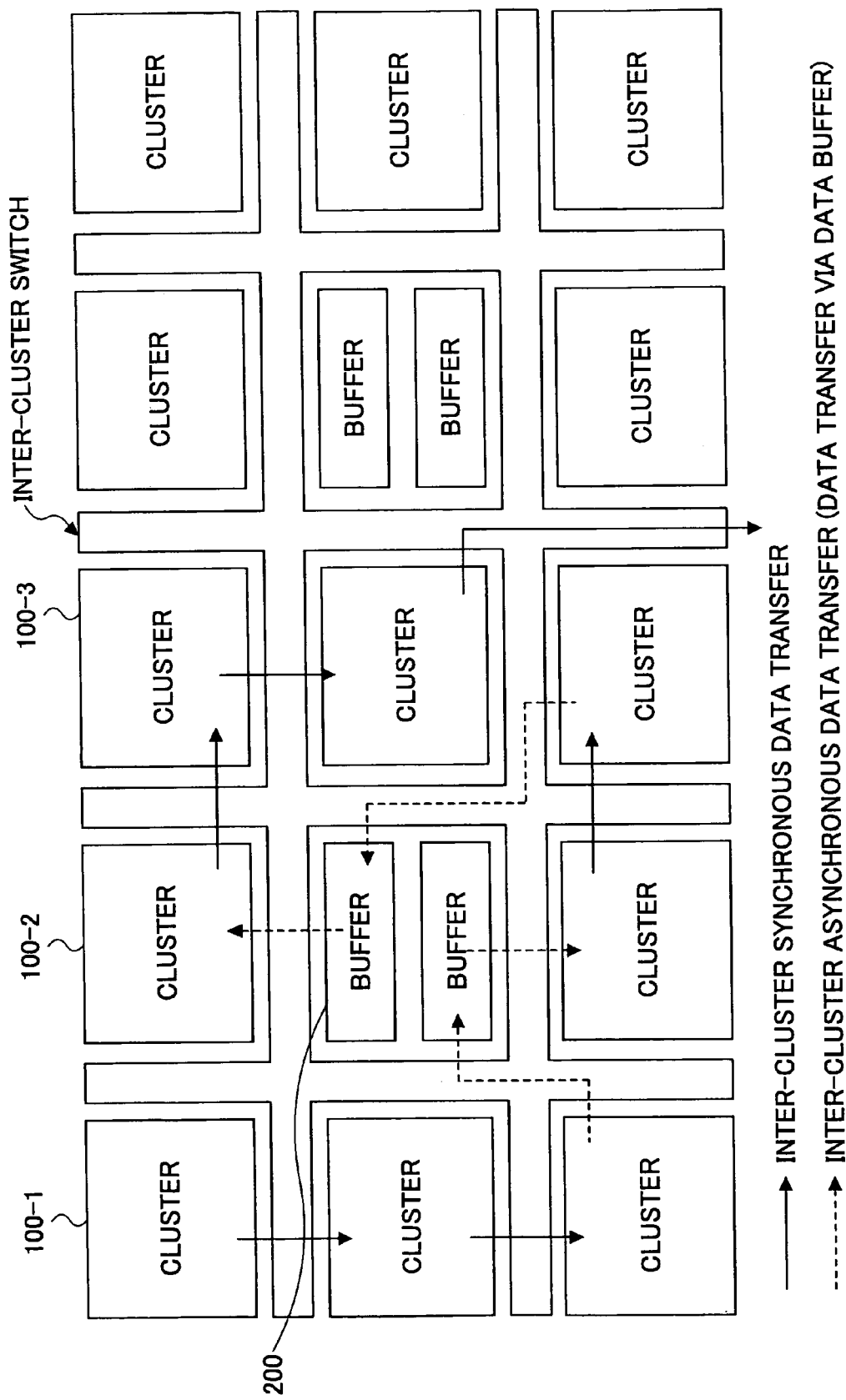
FIG. 2 illustrates an inter-cluster data transfer method according to one embodiment of the present invention.

In this example, as shown in FIG. 2, the data buffer clusters 200 are disposed in the center of the other plurality of clusters 100. However, it is also possible to dispose the data buffer clusters 200 also in the periphery of the other clusters 100 accommodating the operation device groups. In such a case, the data buffers of the data buffer clusters 200 may be used as buffers for fetching data from external memories. Such an example will be described as a fifth embodiment later.

Figure 12:
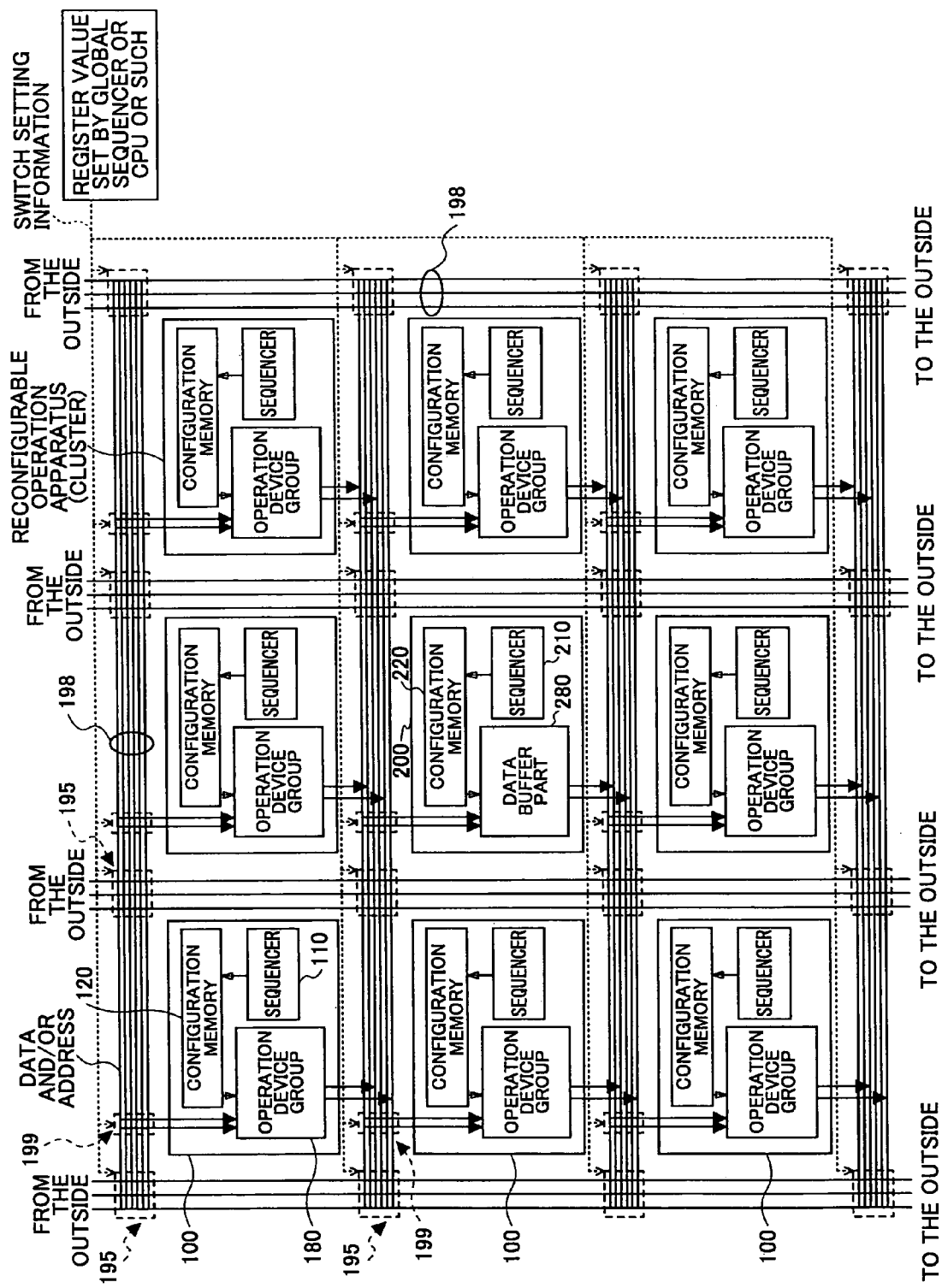
FIG. 12 shows a block diagram of an operation apparatus including a plurality of clusters according to a fourth embodiment of the present invention.

FIG. 12 shows a configuration of a reconfigurable operation apparatus according to a fourth embodiment of the present invention. Also this embodiment is advantageous for solving the above-mentioned second problem. However, the same as in the example of FIG. 6, an inter-cluster data transfer network is configured not by a crossbar but by electric wires 198 and switches 195, 199. Further, the same as in the example of FIG. 9, the data buffer part 135 is not provided in each cluster 100 accommodating the operation device group, but the data buffer cluster 200 is provided independently on the same level as that of the other cluster 100 accommodating the operation device group. A configuration of the data buffer cluster 200 in this embodiment is same as that in the above-described third embodiment except that the crossbar 290 is excluded, and the duplicated description is omitted.

Figure 13:
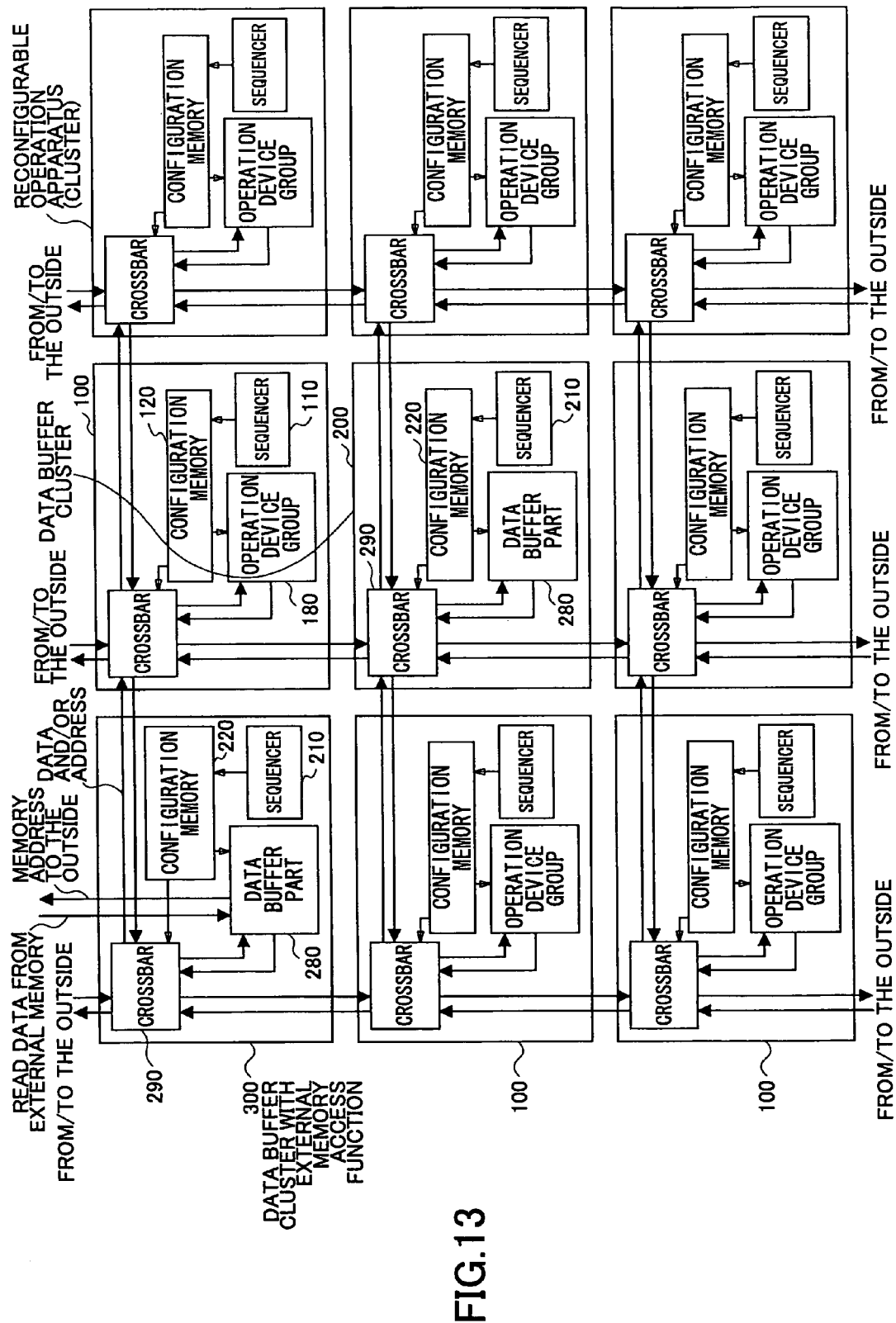
FIG. 13 shows a block diagram of an operation apparatus including a plurality of clusters according to a fifth embodiment of the present invention.
Figure 14:
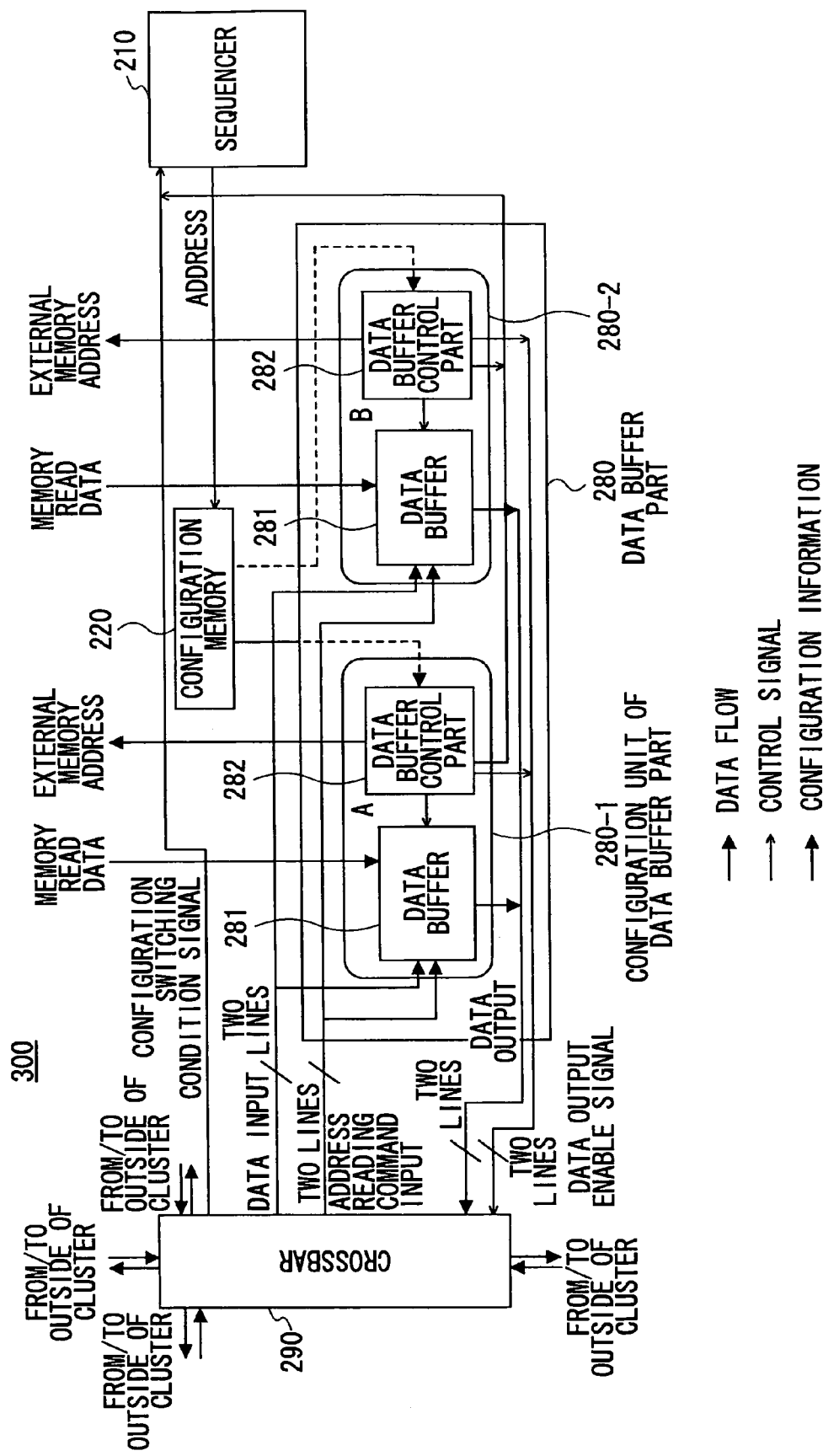
FIG. 14 shows a block diagram of an internal configuration of a data buffer cluster in the embodiment shown in FIG. 13.

FIG. 13 shows a configuration of a reconfigurable operation apparatus according to the fifth embodiment of the present invention. In this embodiment, other than the clusters 100 accommodating the operation device groups and the data buffer cluster 200, a data buffer cluster 300 with an external memory access function is provided. FIG. 14 shows an internal configuration of the data buffer cluster 300 with the external memory access function. This type of the data buffer cluster 300 acts as the ordinary data buffer cluster 200, and also, has a configuration enabling generation of a memory address for an external memory and carrying out data reception from the external memory in response thereto. Accordingly, the data buffer cluster 300 with the external memory access function has the same configuration as that of the ordinary data buffer cluster 200 shown in FIG. 10. The same reference numerals are given to the corresponding parts in the figure, and the duplicated description therefor is omitted. However, as described later, a configuration in the data buffer control part 282 is different from that in the ordinary data buffer register, in that a predetermined function is added as described next.

Figure 15:
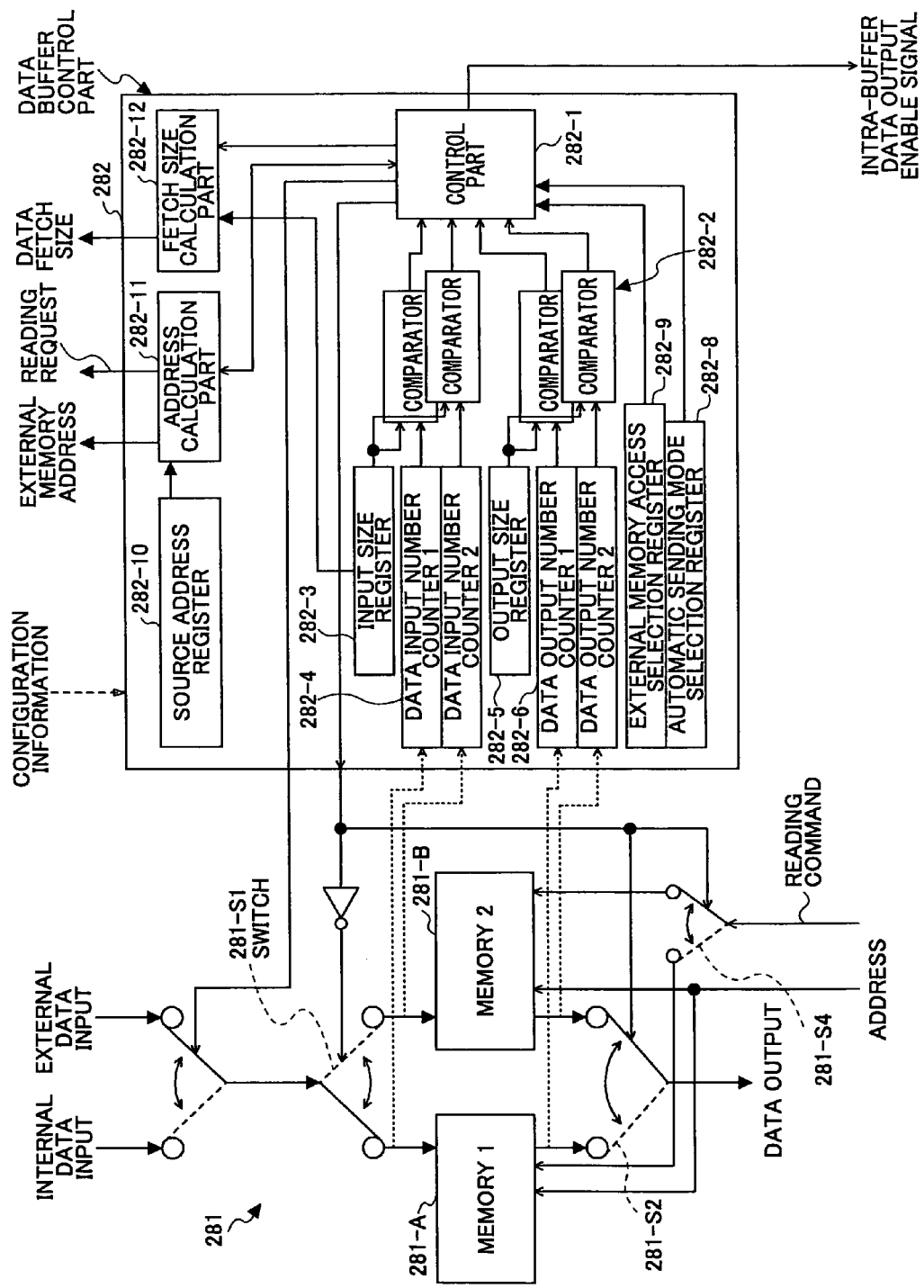
FIG. 15 shows a block diagram of a data buffer part according to the embodiment shown in FIG. 13.

FIG. 15 shows each data buffer control part in the fifth embodiment. In the figure, the same reference numerals are given to the parts corresponding to those shown in FIG. 11A, and the duplicated description is omitted. What is different from the configuration shown in FIG. 11A is that, in the data buffer control part 282, an external memory access selection register 282-9, a source address register 282-10, an address calculation part 282-11 and a fetch size calculation part 282-12 are added. The external memory access selection register 282-9 acts as a control register, and is a register for setting whether or not access to an external memory is carried out. In the source address register 282-10, a top address in a memory space of the external memory to access is written. Since the source address written is an address in the memory space, access can be made not only to the external memory, but also to other information mapped in the same memory space, for example, an internal RAM or such existing outside of the reconfigurable operation apparatus including the plurality of clusters 100, 200 and 300 shown in FIG. 13.

The fetch size calculation part 282-12 is a register for changing a size set in the input size register 282-3 when this size cannot be used as it is for accessing externally. For example, in a case where a size set in the input size register is 64B while access to the outside is allowed only in a 16B unit, generation of a request with 16B is made possible (details are mentioned later). Then, the address calculation part 282-11 outputs first an address which is set in the source address register 282-10, and after that, outputs addresses such as those obtained from incrementing the first address with 16B, 32B, 48B, . . . , in sequence. On the other hand, also in a case where a data boundary indicated by a value in the source address register 282-10 is problematically in between actual boundaries, proper adjustment is made possible. For example, in a case where the source address does not agree with an 8B boundary even when a minimum unit in the eternal access is 8B, the source address is aligned with the 8B boundary, and then, the address after being thus aligned is output.

FIG. 16 shows the configuration information for each data buffer part in this case. With respect to the third embodiment, an 'external access' setting field and a 'source address' setting field for setting information in the above-mentioned external memory access selection register 282-9 and source address register 282-10 are added.

Figure 18A:
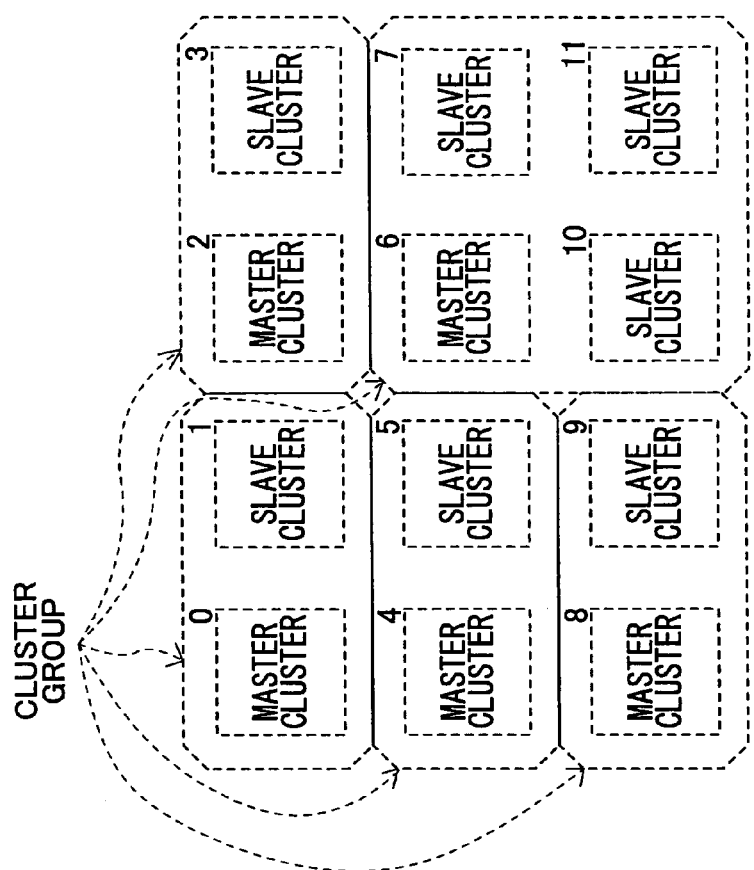
FIGS. 18A and 18B show examples of configurations of cluster groups in a method shown in FIG. 17.
Figure 18B:
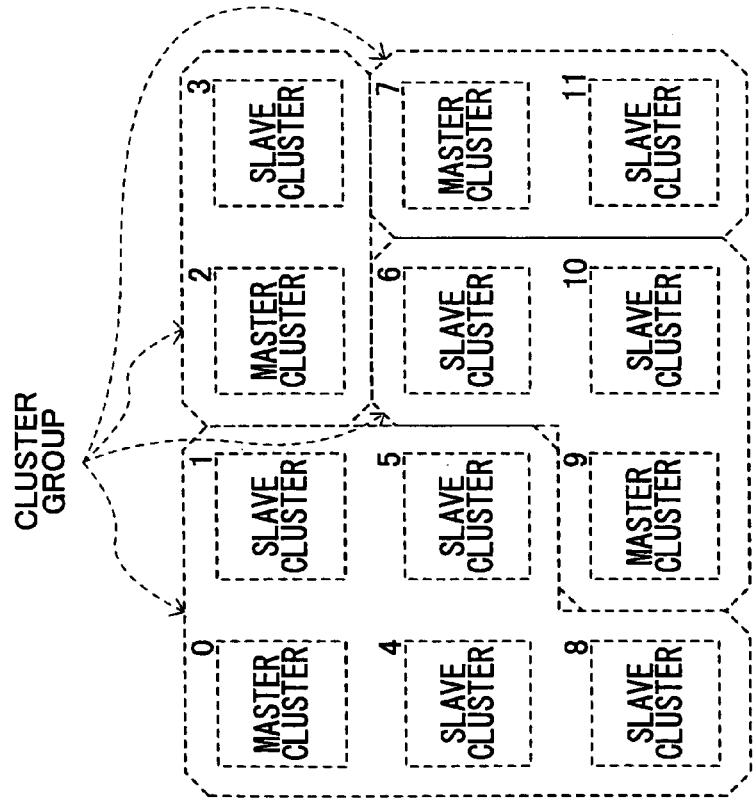

FIG. 17 illustrates a manner in which a CPU 600 controls a plurality of clusters 500 mutually connected electrically, including the above-mentioned clusters 100 accommodating the operation device groups, data buffer clusters 200 or data buffer clusters 300 with external memory access functions. FIGS. 18A and 18B show group configuration examples when the plurality of clusters shown in FIG. 17 are grouped.

Each cluster may be made to function as a master cluster or a slave cluster. For example, this assignment may be carried out with the use of a predetermined list which a processor such as the CPU 600 has. The CPU 600 starts up the master clusters, and also, gives a finish instruction thereto. Further, when an interrupt for program end is generated from the master cluster to an interrupt arbitration part 700 shown in FIG. 17, the interrupt arbitration part 700 generates an interrupt signal to the CPU 600.

As shown in FIGS. 18A and 18B, the respective clusters configure a cluster group with the master cluster regarded as a top thereof, and processing is carried out for each cluster group. Data transfer between the cluster groups is carried out by means of, for example, the above-mentioned data buffer parts.

Figure 19A:
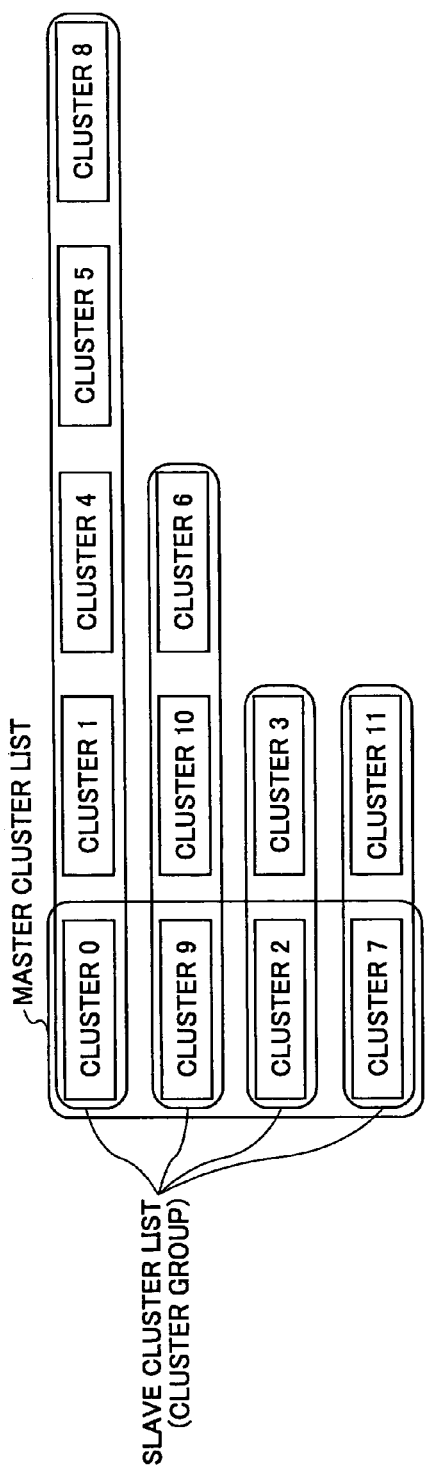
FIGS. 19A and 19B show examples of cluster lists setting the cluster groups.
Figure 19B:
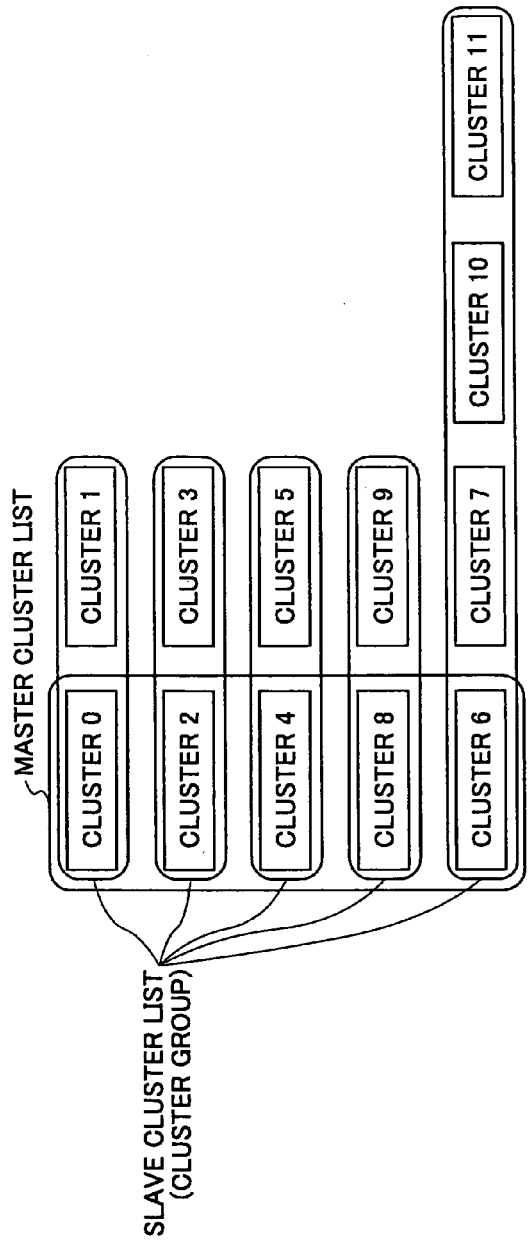

The cluster group may include any clusters, and such a configuration of the cluster group may be set by the above-mentioned list. FIGS. 19A and 19B show examples of the list. In these examples, a list structure in software is utilized. In the examples, as shown, slave cluster lists (for cluster groups) are configured each having a master cluster regarded as a head node there.

FIG. 20 shows an operation flow of the reconfigurable operation apparatus including the plurality of clusters as mentioned above. First, in Step S1, the CPU 600 sets a processing task in a state table of the sequencer in each cluster. In Step S2, the CPU starts up each master cluster, and gives it an instruction. As a result, in Step S11, each slave cluster 500 starts operation. Then in Step S12, each cluster group designated by the above-mentioned list starts operation.

In Step S3, the CPU determines whether or not the clusters are in a freelance mode. When the determination result is Yes, the CPU makes operation finish instruction to the clusters in Step S4. When the determination result is No in Step S3, the CPU waits for an interrupt for end notification from the clusters in Step S5.

When the clusters are in the freelance mode, operation processing is carried out by the cluster group in Step S13. However, when the clusters are in an ordinary mode, the cluster group carries out operation processing in Step S14, and, then, at the end of the processing, the clusters generate the end notification to the CPU in Step S15.

Figure 21:
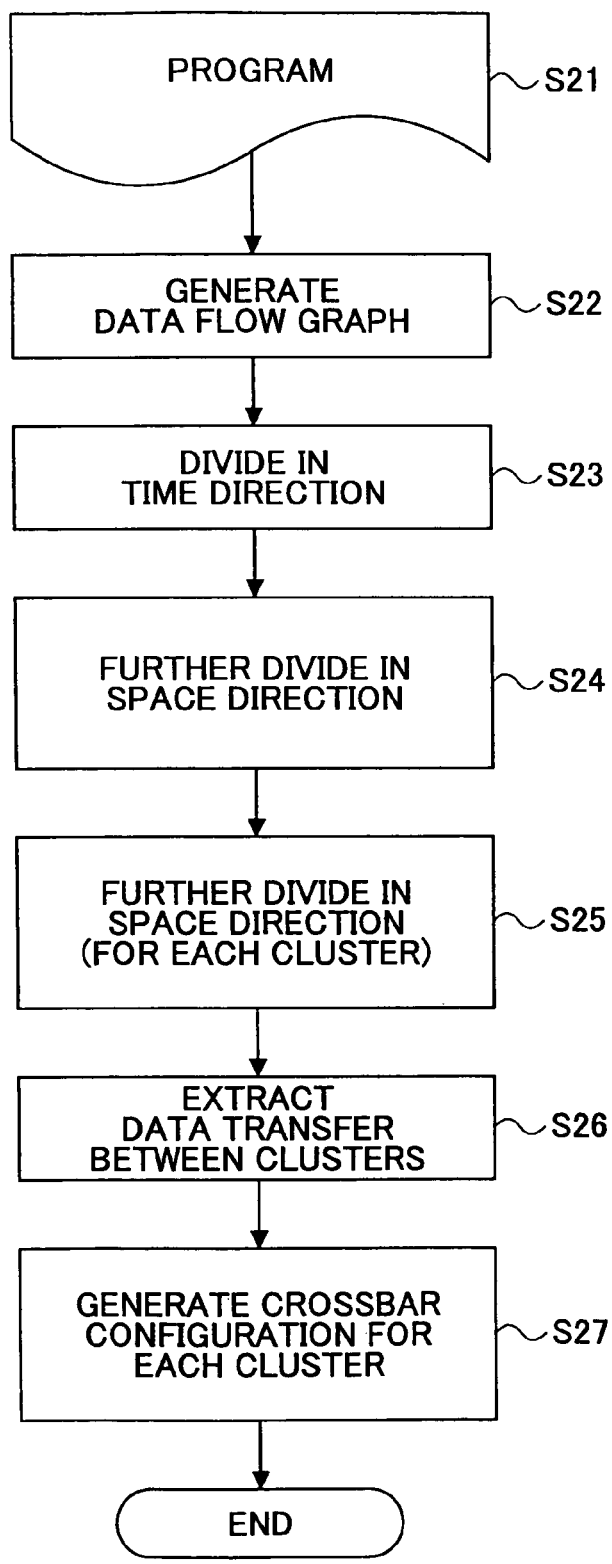
FIG. 21 shows a flow chart of a method for generating crossbar setting information according to one embodiment of the present invention.

FIG. 21 shows operation of generating the configuration information for the above-mentioned crossbar 190 or 290. In the figure, in Step S22, a data flow graph is generated for data transfer among the plurality of clusters. In Step S23, the thus-generated graph is divided in a time axis. In Step S24, the thus-divided ones are further divided in a spatial direction. In Step S25, the thus-obtained ones are further divided in a spatial direction so that data transfer for each cluster unit is extracted. In Step S26, data transfer between different cluster units is extracted. In Step S27, based on thus-extracted information, the configuration information is generated for each cluster. Such operation processing may be carried out by means of a computer according to an appropriate program.

Figure 22:
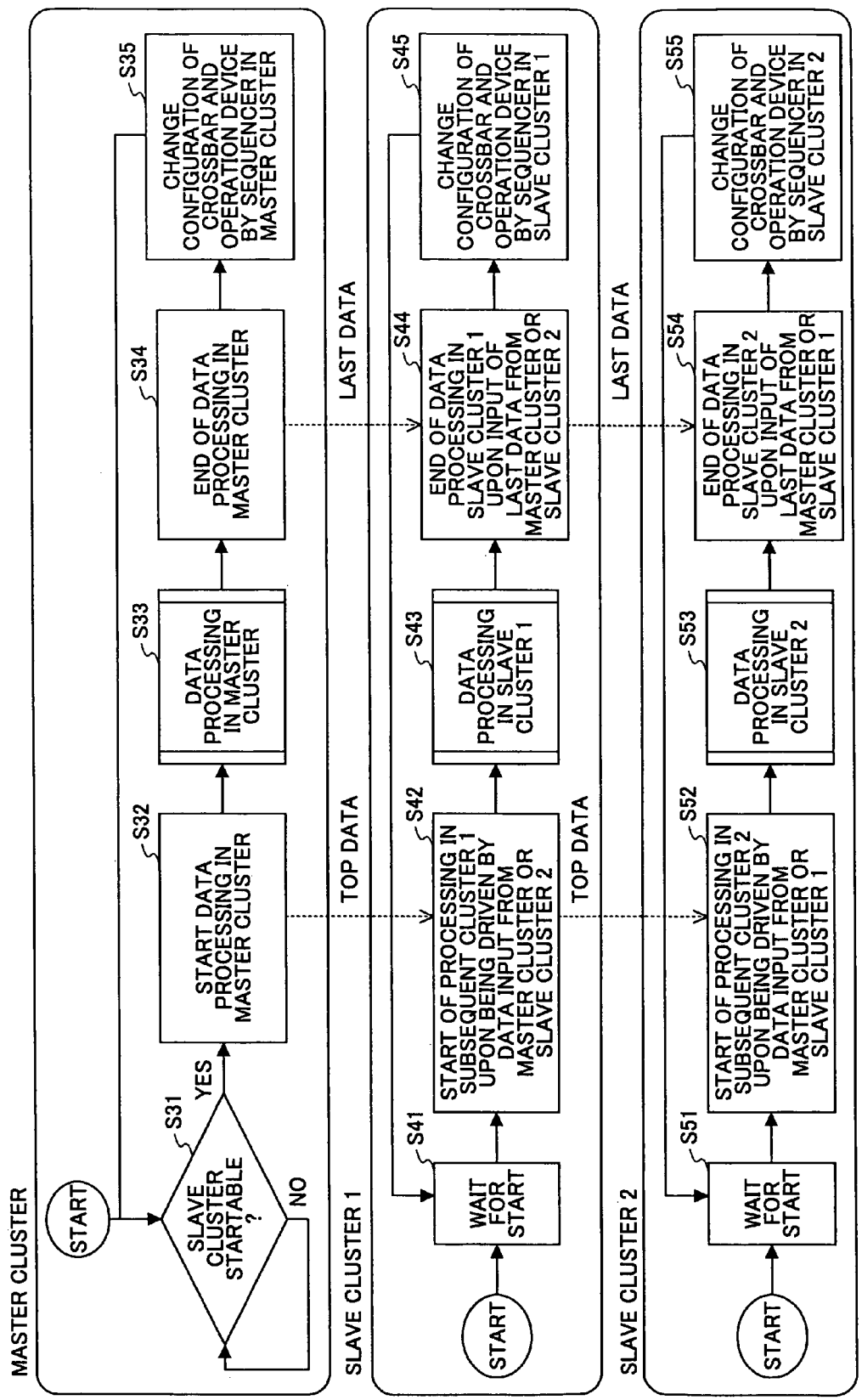
FIG. 22 shows a flow chart of operation processing operation in a cluster group, and configuration change processing operation for an operation device group including a crossbar switch according to one embodiment of the present invention.

FIG. 22 shows an example of an operation processing operation flow in the above-mentioned cluster group and a configuration changing processing operation flow for the operation device group including the crossbar. Here, the cluster group includes total three clusters, i.e., a single master cluster and two slave clusters. In the figure, in Step S31, it is determined whether the slave clusters are in a condition where they are allowed to start operation. When the determination result is Yes, data processing is started in the master cluster in Step S32. In Step S33, as a result, data processing is carried out in the master cluster, and, in Step S34, when the processing is finished, configuration of the crossbar 190 and the operation device group 180 in the master cluster is changed for processing of a subsequent stage, by means of the sequencer in the master cluster in Step S35. After that, the flow is returned to Step S31.

The first slave cluster waits for starting processing in Step S41. Then, in Step S42, the first slave cluster starts processing as a result of being driven by data input from the master cluster or the second slave cluster. In Step S43, the first slave cluster carries out the relevant processing, and, finishes the same as a result of last data being input from the master cluster or from the second slave cluster. In Step S45, configuration of the crossbar 190 and the operation device group 180 in the first slave cluster is changed for processing the subsequent stage by means of the sequencer in this slave cluster. After that, the flow is returned to Step S41.

The second slave cluster waits for starting processing in Step S51. Then, in Step S52, the second slave cluster starts processing as a result of being driven with data input from the master cluster or from the first master cluster. In Step S53, the second slave cluster carries out the relevant processing, and, finishes the same as a result of last data being input from the master cluster or from the first slave cluster. In Step S55, configuration of the crossbar 190 and the operation device group 180 in the second slave cluster is changed for processing the subsequent stage by means of the sequencer in this slave cluster. After that, the flow is returned to Step S51.

Although the data flows in an order of the master cluster, the first salve cluster and then the second slave cluster in the above-described example, a manner of operation flow is not limited thereto. The manner of operation flow is arbitrary changed by means of appropriately setting the configuration information in the respective configuration memories. As a result, it is possible to make setting such that data flows in an order of the master cluster, the second slave cluster and then the first slave cluster. Alternatively, it is also possible to make setting such that data flows in an order of the master cluster, the first slave cluster, the second slave cluster, and further, the master cluster again. That is, last data is returned finally from the second slave cluster to the master cluster. Further alternatively, it is also possible to make setting for further complicated data flow such that data is transferred between different clusters in a data exchanging manner.

Figure 23:
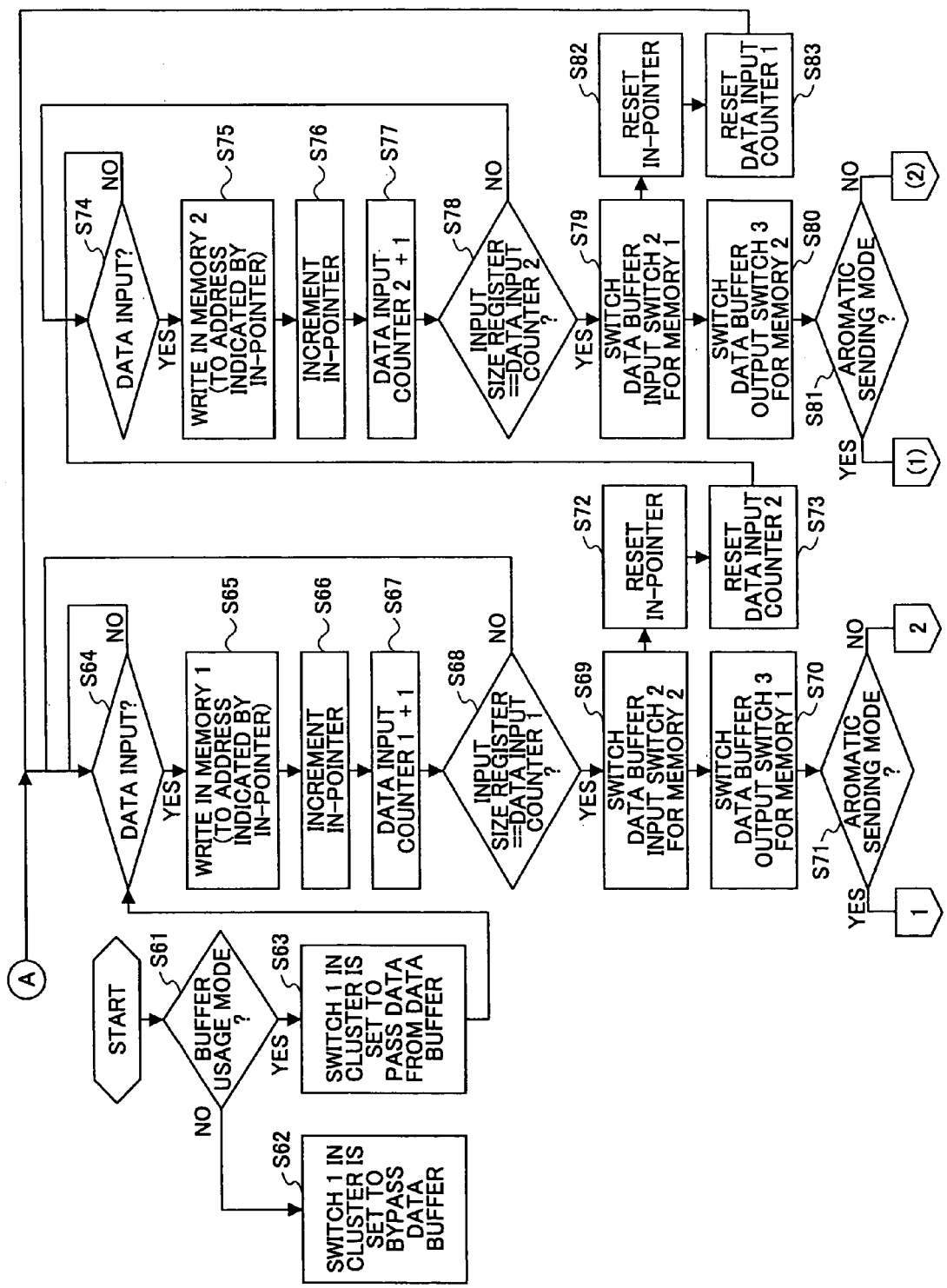
FIGS. 23, 24 and 25 show flow charts of control operation of a data buffer part when the data buffer is provided in a cluster according to one embodiment of the present invention.

FIG. 23 shows a control flow of the data buffer part 135 in a case where the data buffer part 135 is included in the cluster 100 (for example, according to the first embodiment of the present invention). In the figure, in Step S61, it is determined whether or not the 'buffer usage' mode is effective. When the determination result is No, a switch by which the buffer in the cluster is bypassed is turned on in Step S62. However, when the determination result is Yes, a path in which the buffer in the cluster is passed through is set by means of switching of the switches inside of the cluster in Step S63. In Step S64, it is determined whether or not data input occurs. When the determination result is Yes, writing of the data in one memory in the double buffer is started in Step S65. In Step S66, its writing pointer is incremented. In Step S67, a value in the data input number counter is incremented by one. In Step S68, the input size register value and the data input number counter value are compared with one another. When they agree with one another, the input switch for the data buffer is switched to the side of the other memory of the double buffer in Step S69.

In Step S70, switching is carried out such that output from the data buffer is made from the one memory of the double buffer. In Step S71, it is determined whether or not the 'automatic sending mode' is effective. On the other hand, in Step S72, a writing pointer for the other memory of the double buffer is reset, and, in Step S73, the memory data input counter for the other memory of the double buffer is reset. When the determination result in Step S71 is Yes, the flow is continued on a flow of FIG. 24, while, when the determination result in Step S71 is No, the flow is continued on a flow of FIG. 25.

In Step S74, it is determined whether or not data input occurs. When the determination result is Yes, writing of the input data in the other memory in the double buffer is started in Step S75. In Step S76, its writing pointer is incremented. In Step S77, a value in the data input number counter is incremented by one. In Step S78, the input size register value and the data input number counter value are compared with one another. When they agree with one another, the input switch for the data buffer is switched to the side of the one memory of the double buffer in Step S79.

In Step S80, switching is carried out such that output from the data buffer is made from the other memory of the double buffer. In Step S81, it is determined whether or not the 'automatic sending mode' is effective. On the other hand, in Step S82, the writing pointer for the one memory of the double buffer is reset, and, in Step S83, the memory data input counter for the one memory of the double buffer is reset. When the determination result in Step S81 is Yes, the flow is continued on a flow of FIG. 24, while, when the determination result in Step S81 is No, the flow is continued on a flow of FIG. 25.

Figure 24:
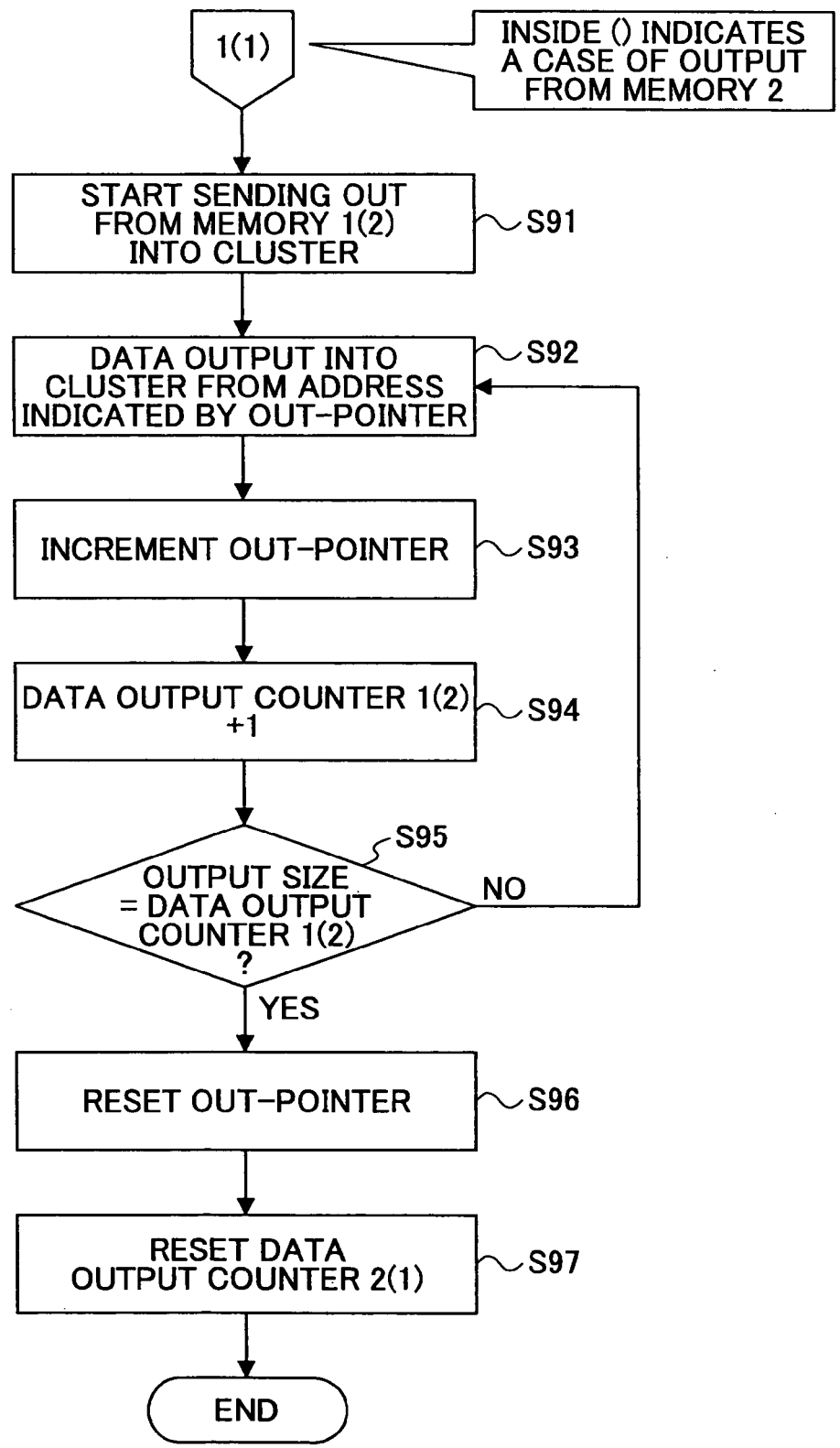

When the result in Step S71 is Yes or the result in the Step S81 is Yes, Step S91 in FIG. 24 is continued on. Then, sending out of data to the inside of the cluster from the memory, from which switching was made such that output should be started in Step S70 or S80, is started. In other words, data is read out from an address pointed out by the output pointer for the relevant memory in Step S92. In Step S93, the pointer is incremented. In Step S94, the data output number counter is incremented. In Step S95, the output data size registrar value and the data output number counter value are compared with one another. When the comparison result becomes 'agreement', the pointer is reset in Step S96, and the data output number counter is reset in Step S97.

Figure 25:
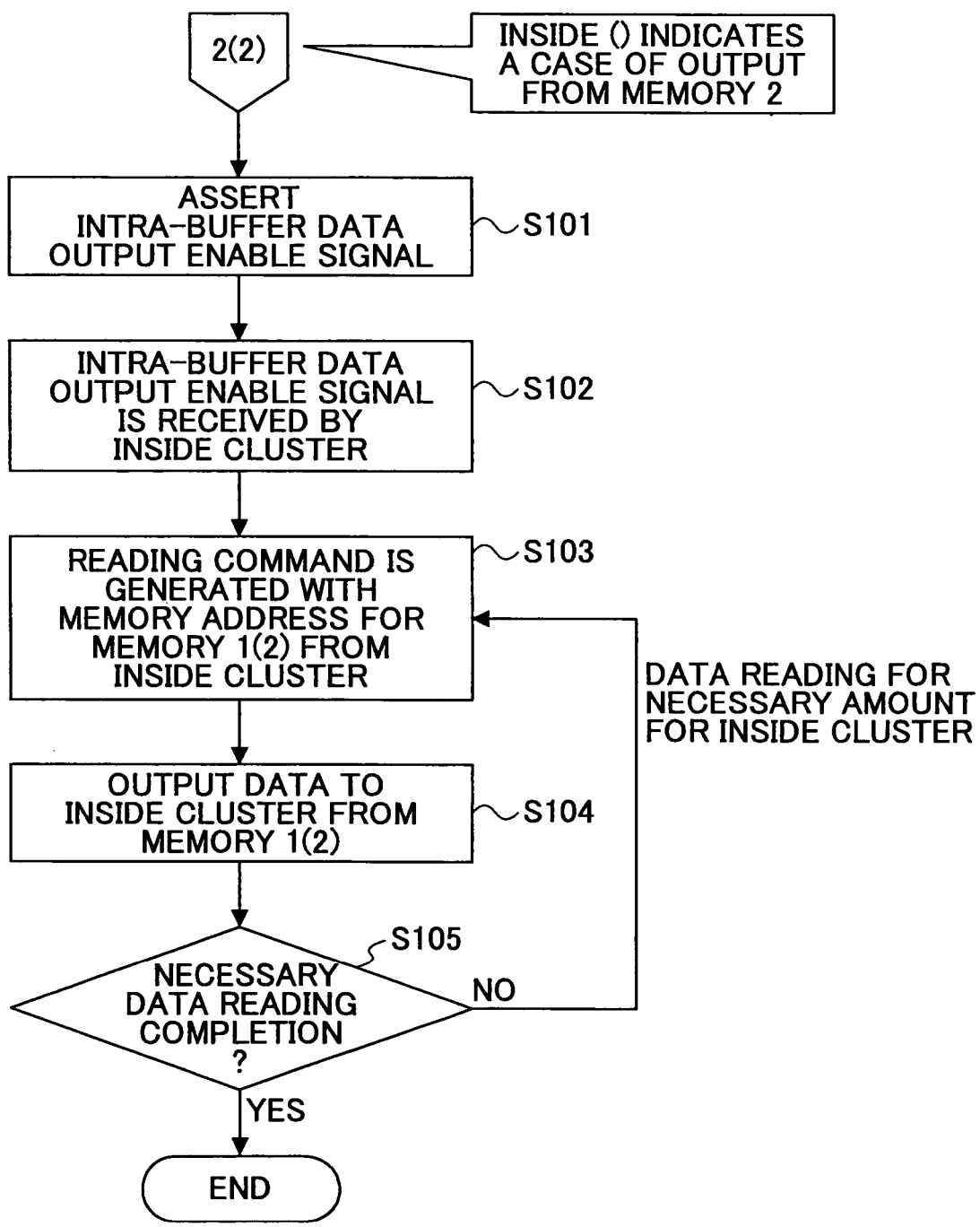

On the other hand, when the result of Step S71 is No or the result of Step S81 is No, Step S101 in FIG. 25 is continued on. Then, the intra-buffer output enable signal is asserted. In Step S102, this signal is received by the inside of the cluster. In Step S103, from the inside of the cluster, a reading command and a memory address are generated for the relevant memory, i.e., the memory from which switching was made in Step S70 or S80 such that output should be made. In Step S104, the relevant memory responds thereto and outputs data to the inside of the cluster. In Step S105, it is determined whether or not reading out of desired data has been completed. Until the completion, the loop of Steps S103 through S105 is repeated.

Figure 26B:
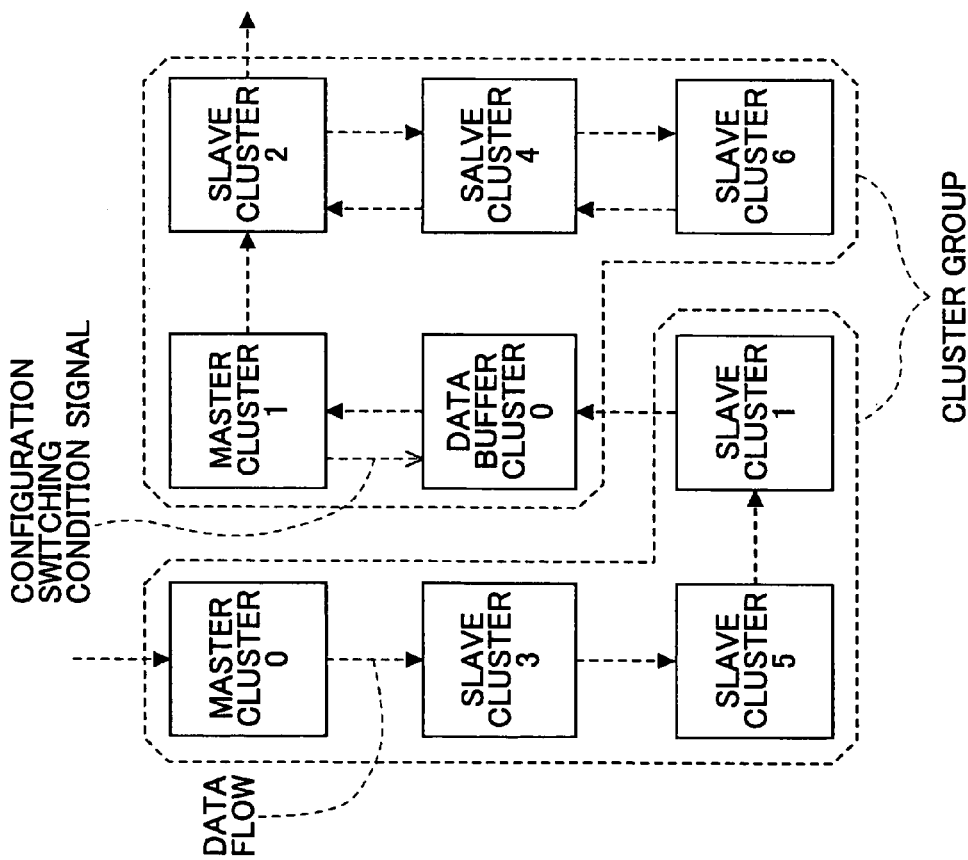
FIGS. 26A and 26B show a flow chart of control operation of a data buffer part when a data buffer cluster is provided independently according to one embodiment of the present invention.
Figure 26A:
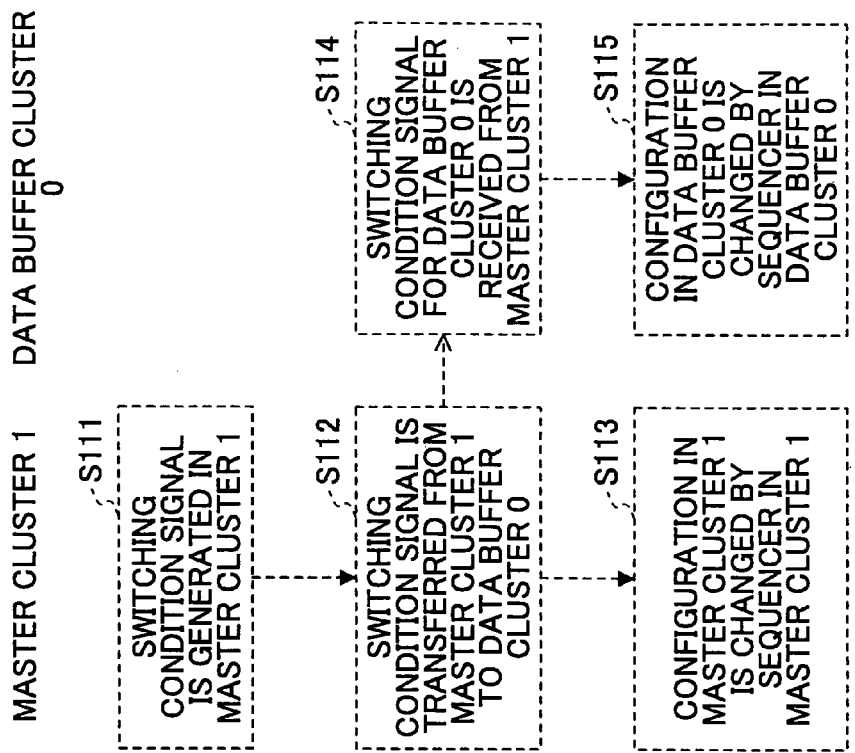

FIGS. 26A and 26B show a control flow in the data buffer cluster in an embodiment in which the data buffer part is provided in a form of independent as the data buffer cluster, i.e., the third, fourth or fifth embodiment of the present invention. Operation of the data buffer cluster is same as the operation of the data buffer part described above with reference to FIGS. 23, 24 and 25 except operation of the bypass switch in a case where the 'buffer usage mode' is ineffective. The duplicated description is omitted.

FIG. 26A shows attributes of the respective clusters in a case where the data buffer cluster is included there; an example of grouping; and a case where the configuration switching condition signal is sent to the data buffer cluster from the master cluster.

In FIG. 26B, in Step S111, when the switching condition signal is generated in the master cluster 1, this switching condition signal is transferred to the data buffer cluster 0 from the master cluster 1 in Step S112. In Step S113, the sequencer in the master cluster 1 changes the configuration in the master cluster 1. On the other hand, in the data buffer cluster 0 which has received the switching condition signal in Step S114, the sequencer thereof changes the configuration of the data buffer cluster 0 in Step S115.

The above-mentioned sending of the configuration switching condition signal from the master cluster 1 to the data buffer cluster 0 is carried out via the crossbar. As a result of the switching condition signal being transferred to the data buffer cluster 0 from the master cluster 1, the information in the state tables of the sequencers is shared between the master cluster 1 and the data buffer cluster 0. Thus, with the use of the common switching condition signal, the configuration in the respective clusters can be switched synchronously therebetween.

Figure 27:
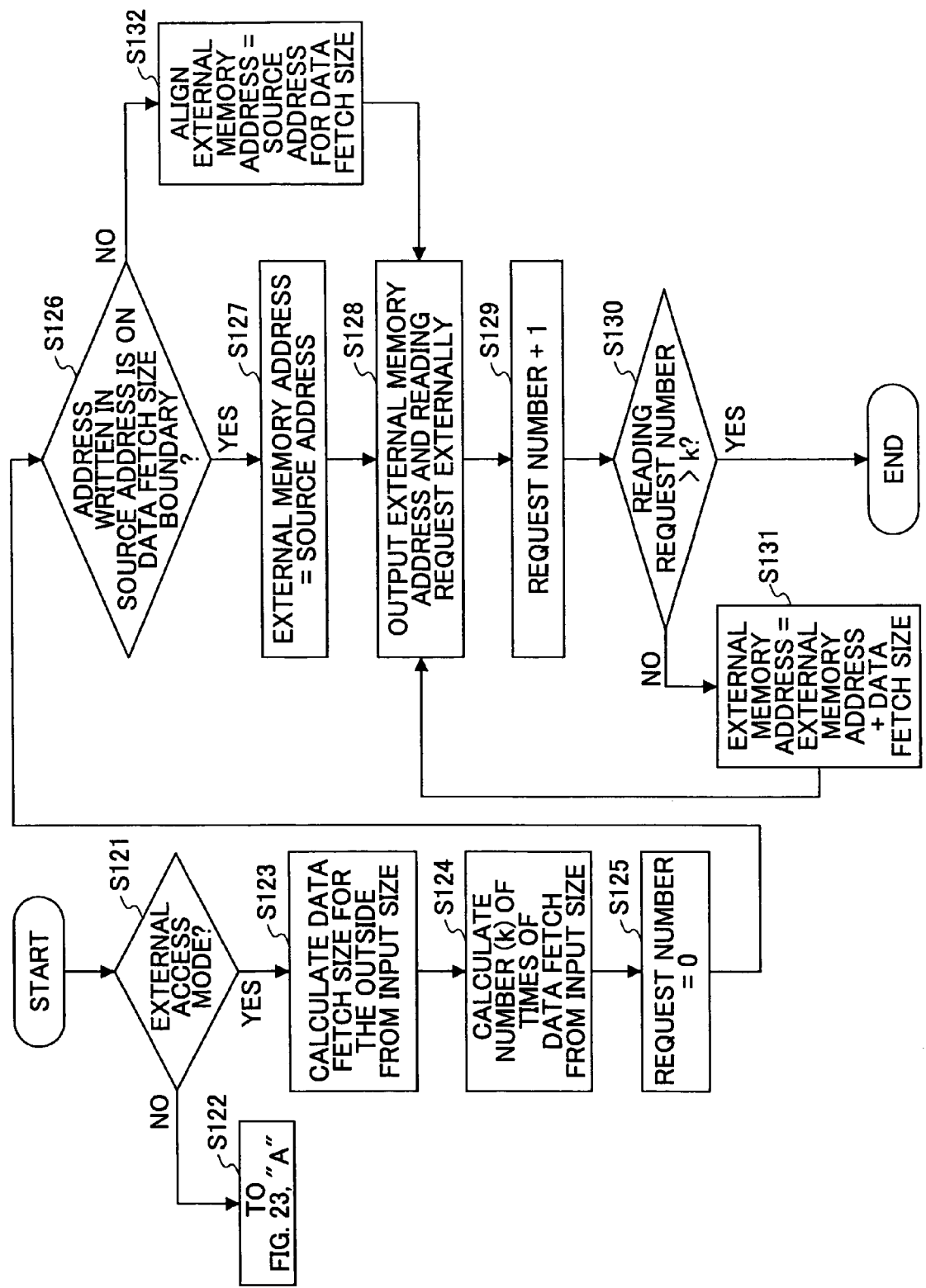
FIG. 27 shows a flow chart of control operation of a data buffer part when a data buffer cluster is provided independently and also a data fetch function for fetching data from an external memory space is provided therein according to one embodiment of the present invention.

FIG. 27 shows a control flow of the fifth embodiment in which the data buffer part is made independent in a form of the data buffer cluster, and also, a data fetch function for fetching data from the external memory space is provided therein. Configuration switching operation in the data buffer cluster is same as that described above with reference to FIGS. 26A and 26B, and the duplicated description is omitted. Further, operation of the data buffer part concerning data transfer between the clusters is same as that described with reference to FIGS. 23 through 25 except the operation of the bypass switch in the case where the 'buffer usage mode' is ineffective, and the duplicated description is omitted.

In Step S121, it is determined whether the external access mode is effective. When the determination result is No, Step S64 in FIG. 23 is continued on. When the determination result is Yes, the fetch size for the outside is calculated from predetermined input size setting information in Step S123. In Step S124, the number (k) of times of external data fetch operation is calculated from the input size setting information. In Step S125, the request number of times is initialized into 0.

In Step S126, it is determined whether or not an address written in the source address register corresponds to an actual data fetch boundary. When the determination result is No, the source address value is aligned for the data fetch size and then is set again as the external memory address in Step S132. On the other hand, when the determination result is Yes, as the external memory address, the source address value itself is set in Step S127, and, in Step S128, the external memory address and the reading request are output externally.

In Step S129, the request number of times is incremented. In Step S130, it is determined whether or not the value in the reading request number of times exceeds the data fetch number of times (k). When the determination result is No, the external memory address is increased by the data fetch size in Step S131, and Step S128 is returned to.

When the determination result in Step S130 becomes Yes, the data fetch is finished. Data thus fetched from the external memory is input to the data buffer in the data buffer cluster. After that, the reading command is generated by another cluster, and thereby, the data is taken by the other cluster. Processing carried out after the data is input to the data buffer from the external memory is same as that carried out after Step S64 in FIG. 23, and the duplicated description is omitted.

Further, the present invention is not limited to the above-described embodiments, and variations and modifications may be made without departing from the basic concept of the present invention claimed below.

What is claimed is
1. An operation apparatus comprising:
a plurality of operation devices operable simultaneously;
a sequencer controlling states of the plurality of operation devices;
a configuration memory storing therein configuration information as setting information for predetermined states of the plurality of operation devices;
a data buffer which stores input data from the outside of the operation apparatus;
a first path which transmits the input data to the plurality of operation devices through the data buffer;
a second path which transmits the input data to the plurality of operation devices not through the data buffer; and
a data buffer control part which controls selection from the first path and the second path, and operation of the data buffer,
wherein the sequencer selects configuration information from the configuration information stored in the configuration memory according to a configuration switching condition signal generated from operation processing of the plurality of operation devices, and path selection and operation control for the data buffer carried out by the data buffer control part are set based on the selected configuration information;
the data buffer is configured as a double buffer and has two memories;
the configuration information for controlling the data buffer is used to determine a writing data size for each of the two memories of the data buffer; and
when an externally input data size agrees with a designated writing data size, a memory in the double buffer is switched to the other memory of the double buffer, and data is taken inside from the memory in which writing from the outside has been carried out until then.

2. The operation apparatus as claimed in claim 1, further comprising:
a predetermined storage device.

3. The operation apparatus as claimed in claim 1, further comprising:
a communication network for switching electric connection among the plurality of operation devices.

4. The operation apparatus as claimed in claim 1, wherein:
the sequencer comprises a state table storing therein information designating an address of the configuration information stored in the configuration memory; and a state control part reading the address from the state table for the configuration memory.

5. The operation apparatus as claimed in claim 1, further comprising a part configured to take the configuration information externally.

6. The operation apparatus as claimed in claim 1, wherein:
an operation carried out by the data buffer control part is controlled by means of an operation mode and an operation parameter.

7. The operation apparatus as claimed in claim 1, wherein:
an operation control carried out by the data buffer control part is switchable according to each state by means of the sequencer.

8. The operation apparatus as claimed in claim 1, wherein; the configuration information for controlling the data buffer control part comprises information for making a setting as to whether the data buffer is used.

9. The operation apparatus as claimed in claim 1, wherein:
the data input from a memory of the data buffer to which data input has been completed is automatically taken for the operation device or a storage device; and
the number of data to be taken corresponds to the data size designated by the configuration information.

10. The operation apparatus as claimed in claim 1, wherein:
when input to the data buffer is completed, a data-output enable signal is output to the operation device, and, from the operation device to the data buffer, a reading address and a reading command are generated, whereby data taking is controllable.

11. The operation apparatus as claimed in claim 1, wherein:
mode switching is carried out by setting of the configuration information between a mode in which data input from the memory of the data buffer to which input has been completed is automatically taken for an operation device or a storage device and the number of data to be taken corresponds to the wiring data size designated by the configuration information, and another mode in which, when input to the data buffer is completed, a data output enable signal is output to the operation device, and, from the operation device to the data buffer, a reading address and a reading command are generated, data taking being controllable by means of the data output enable signal, the reading address and the reading command.

12. The operation apparatus, comprising a plurality modules each having a configuration of the operation apparatus claimed in claim 1, wherein data transfer between the modules is carried out via data buffers controlled by data buffer control parts, the data buffers are controlled by the configuration information stored in the configuration memories of the modules, and whether or not the data buffers are used is set by means of the configuration information.

13. The operation apparatus as claimed in claim 12, wherein:
each module has a crossbar switch, data transfer between he modules is carried out by means of the crossbar switch, input or output data of each module is received from or transmitted to the crossbar switch, the crossbar switch also carries out data transfer between other adjacent modules, setting information for the crossbar switch is set by means of the configuration information stored in a configuration memory of a module, and switching of a state setting is controlled by a sequencer in the module.

14. The operation apparatus as claimed in claim 12, wherein:
data input and output of each module is switchably carried out with the use of a switch provided in a circuit connection between the modules; and
a setting of the switch is carried out as a result of the configuration information set in the configuration memory being selected by means of a control part or a CPU provided other than the plurality of modules according to predetermined configuration selection information separately set, and the predetermined configuration selection information being written in a temporary storage circuit within the switch.

15. An operation apparatus control method for controlling an operation apparatus which comprises a plurality of operation devices operable simultaneously; a sequencer controlling states of the plurality of operation devices; and
a configuration memory storing configuration information as state setting information for states of the plurality of operation devices, the method comprising:
providing a first path which passes through a data buffer and a second path which does not pass through the data buffer when inputting data to the plurality of operation devices, the data buffer being included in the operation apparatus and storing the data input from the outside of the operation apparatus;
controlling selection from the first and second paths and operation of the data buffer;
selecting with the sequencer configuration information from the configuration information stored in the configuration memory according to a configuration switching condition signal generated from operation processing of the plurality of operation devices;
setting path selection between the first and second paths and operation control for the data buffer based on the selected configuration information;
determining a writing data size for each of two memories of the data buffer, the data buffer being configured as a double buffer; and
when an externally input data size agrees with the designated writing data size, switching one memory of the two memories of the double buffer to the other memory, and taking data inside from the one memory to which writing from the outside has been carried out until then.

16. The operation apparatus control method as claimed in claim 15, further comprising:
setting, in a form of the configuration information, as to whether or not the data buffer is used.

17. The operation apparatus control method as claimed in claim 15, further comprising:
automatically taking data from a memory of the data buffer to which input has been completed for an operation device or a storage device; and
determining the number of data to be taken to correspond to the wiring data size designated by the configuration information.

18. The operation apparatus control method as claimed in claim 15, comprising:
when input to the data buffer is completed, outputting a data output enable signal to an operation device, and, from the operation device to the data buffer, providing a reading address and a reading command, data taking being controllable by means of the data output enable signal, the reading address and the reading command.

19. The operation apparatus control method as claimed in claim 15, comprising carrying out switching between a mode in which data input from a memory of the data buffer to which input has been completed is automatically taken for an operation device or a storage device and the number of data to be taken corresponds to the wiring data size designated by the configuration information, and another mode in which, when input to the data buffer is completed, a data output enable signal is output to an operation device, and, from the operation device to the data buffer, a reading address and a reading command are provided, data taking being controllable by means of the data output enable signal, the reading address and the reading command.

20. The operation apparatus control method as claimed in claim 15, for controlling an operation apparatus comprising a plurality modules each configured as the operation apparatus of claim 15, comprising:
  carrying out data transfer between the modules via a data buffer;
  setting contents of controlling of the data transfer in a form of the configuration information stored configuration memories of the modules, wherein:
  whether or not the data buffer is used can be set in the configuration information.

* * * * *